US012496476B2

(12) United States Patent
Switzer et al.

(10) Patent No.: US 12,496,476 B2
(45) Date of Patent: Dec. 16, 2025

(54) BATTERY COLLECTION SYSTEMS AND METHODS OF USING THE SAME

(71) Applicant: Redwood Materials, Inc., Carson City, NV (US)

(72) Inventors: Jackson Switzer, Incline Village, NV (US); Alexis Georgeson, Incline Village, NV (US); Mike Joyer, Reno, NV (US); Haley Ketterer, Incline Village, NV (US)

(73) Assignee: Redwood Materials, Inc., Carson City, NV (US)

( * ) Notice: Subject to any disclaimer, the term of this patent is extended or adjusted under 35 U.S.C. 154(b) by 139 days.

(21) Appl. No.: 18/485,669

(22) Filed: Oct. 12, 2023

(65) Prior Publication Data

US 2024/0216726 A1 Jul. 4, 2024

Related U.S. Application Data

(60) Provisional application No. 63/477,612, filed on Dec. 29, 2022.

(51) Int. Cl.
*A62C 3/00* (2006.01)
*B65F 1/14* (2006.01)

(52) U.S. Cl.
CPC ............ *A62C 3/002* (2013.01); *B65F 1/1426* (2013.01)

(58) Field of Classification Search
CPC ....... B65D 90/51; A62C 3/002; B65F 1/1426; B65F 2240/108; H01M 10/54
See application file for complete search history.

(56) References Cited

U.S. PATENT DOCUMENTS 3,651,771 A * 3/1972 Eberle ..................... F23G 5/165 110/213
3,654,616 A * 4/1972 Dunne .................. G05B 19/16 219/79

(Continued)

FOREIGN PATENT DOCUMENTS

CN 215513718 U 1/2022
WO 2014/074113 A1 5/2014

OTHER PUBLICATIONS

International Search Report and Written Opinion as received in PCT/US2023/076818 dated Mar. 13, 2024.

*Primary Examiner* — Kareen K Thomas
(74) *Attorney, Agent, or Firm* — Keller Preece PLLC

(57) ABSTRACT

The present disclosure relates to systems, non-transitory computer-readable media, and methods for collecting batteries and other devices for disposal or recycling. In particular, in one or more embodiments, the disclosed systems provide a battery collection bin comprising a transport drum within an enclosure and a removable cartridge or internal basin filled with fire suppressant. Also, in some embodiments, the disclosed systems detect deposit of a battery through a feed chute into the transport drum and determine, based on signals from one or more sensors, a fill level, volume, or weight of the transport drum. In response, embodiments of the disclosed systems utilize a dispensing system to dispense a measure of fire suppressant from the removable cartridge or internal basin into the transport drum to prevent unwanted thermal events. Additional mechanisms and related methods for streamlined and safe collection of batteries and other devices are disclosed.

20 Claims, 28 Drawing Sheets

(56) References Cited

U.S. PATENT DOCUMENTS

| | | | | | |
|---|---|---|---|---|---|
| 3,838,651 | A | * | 10/1974 | Dingwell | F23G 7/05 431/278 |
| 3,877,400 | A | * | 4/1975 | Dingwell | F23G 7/05 110/238 |
| 3,991,475 | A | * | 11/1976 | Segrest | G01B 5/061 367/4 |
| 4,183,654 | A | * | 1/1980 | Waschk | G03G 15/201 355/69 |
| 2013/0264346 | A1 | | 10/2013 | Donahue | |
| 2020/0147422 | A1 | | 5/2020 | Atkinson et al. | |

* cited by examiner

BATTERY COLLECTION SYSTEMS AND METHODS OF USING THE SAME

CROSS-REFERENCE TO RELATED APPLICATIONS

This application claims priority to, and the benefit of, U.S. Provisional Patent Application No. 63/477,612 filed Dec. 29, 2022, which is incorporated herein by reference in its entirety.

BACKGROUND

Recent years have seen a significant increase in the implementation of various types of batteries as an alternative to fossil fuels and other sources of energy. Moreover, the recent surge in popularity of electric vehicles and other electronic devices containing batteries has resulted in a significant increase in demand for battery production, as well as an increased demand for safe and efficient recycling or disposal of batteries and battery materials.

Despite advances in battery production and implementation in various fields of use, existing methods for mass recycling and/or disposal of batteries and battery materials face several shortcomings. For example, conventional systems can safely recycle or dispose of batteries of particular chemical compositions, contained energies, or form factors, such as but not limited to various types of lithium-ion batteries. However, certain compositions of batteries or devices are unstable and unsafe when improperly handled. Accordingly, conventional methods for collecting batteries or devices from consumers often require a trained handler to receive and, in some cases, personally prepare each battery or device for safe transportation to a recycling facility. For example, conventional methods require the trained handler to tape the terminals of each battery and place each battery or device in a separate bag or container. In certain circumstances, consumers may be permitted to personally prepare batteries for storage and transport by taping the terminals and/or encasing individual batteries in a designated container. Moreover, additional safety measures are generally required to ensure immediate response in case of a thermal event caused by disposed batteries or devices.

Accordingly, batteries and devices of varying classifications must be processed, stored, and shipped with a high level of care. Unfortunately, conventional methods of receiving and preparing batteries and devices for disposal or recycling generally require attention from a trained handler and extensive cautionary processing, resulting in an inefficient and often inconvenient process.

These along with additional problems and issues exist with regard to conventional systems for collecting batteries and devices.

BRIEF SUMMARY

Embodiments of the present disclosure provide benefits and/or solve one or more of the foregoing or other problems in the art with systems, apparatuses, non-transitory computer-readable media, and methods for safely receiving, storing, and transporting batteries for disposal or recycling. For example, the disclosed systems provide a convenient battery collection bin where consumers may safely deposit batteries, without assistance from a trained associate, by simply dropping one or more batteries or devices into a chute of the battery collection bin. While maintaining such convenience of operation, the disclosed systems ensure safe receipt, storage, and handling of deposited batteries by providing, for example, intelligently automated distribution of fire suppressant over the deposited batteries or devices, as well as various options for automated detection of, and response to, thermal and/or chemical events.

In some embodiments, for example, an apparatus for collecting batteries comprises a bin or enclosure configured to receive and secure a transport drum for storing and transporting deposited batteries and devices. Also, the apparatus comprises a chute operable to direct deposited batteries and devices into the transport drum when positioned within the enclosure or bin. Further, in some embodiments, a removable fire suppressant cartridge is disposed above the transport drum and associated with a fire suppressant dispensing mechanism configured to selectively dispense fire suppressant from the fire suppressant cartridge into the transport drum when a battery is deposited therein via the chute. In one or more embodiments, the fire suppressant cartridge comprises a jug or similar container filled with fire suppressant which can be loaded into an internal basin of the bin or enclosure by affixing the jug to a receiving hatch of the apparatus. In addition, in some embodiments, the apparatus further includes one or more sensors configured to determine one or more of a fill level, volume, or weight of the transport drum within the enclosure, thermal properties within the enclosure, carbon dioxide levels within the enclosure, or a number of batteries or devices deposited within the transport drum within the enclosure. Also, in one or more embodiments, the apparatus includes additional safety measures, such as but not limited to a blast plate configured to redirect percussion blasts from explosions occurring within the enclosure or bin and/or an emergency fire suppressant hatch configured to release available fire suppressant into the enclosure bin in response to elevated temperatures occurring therein.

Moreover, in some embodiments, a battery collection system receives, from one or more sensors, signals indicating a number of objects deposited within a battery collection bin and a fill level, volume, or weight of the battery collection bin. Also, the battery collection system can determine a measure of fire suppressant based at least on the fill level, volume, or weight of the battery collection bin when an object is deposited therein. In response, the battery collection system can dispense, from a fire suppressant cartridge or an internal basin (e.g., an internal hopper), the determined measure of fire suppressant and provide, for display on a client device associated with the battery collection bin (e.g., on a local or remote device), an indication of the number of objects deposited within the battery collection bin.

Further, in some embodiments, the battery collection system further determines, in response to receiving signals indicating the fill level, volume, or weight of the battery collection bin, that the fill level, volume, or weight has reached a threshold fill level, volume, or weight, then provides, for display on the client device associated with the battery collection bin (e.g., on a local or remote device), an indication that the threshold fill level, volume, or weight is reached and secures one or more access doors to restrict access to and use of the battery collection bin. Also, in one or more embodiments, the battery collection system determines, in response to receiving signals indicating a volume, weight, or fill level of fire suppressant available for dispersal, that an amount of fire suppressant available falls below a threshold value, then provides, for display on the client device associated with the battery collection bin, an indication that insufficient fire suppressant is available and/or secures one or more access doors to restrict access to the battery collection bin.

Accordingly, the disclosed embodiments provide significant advantages over existing solutions, such as increased convenience and efficiency enabled by providing a battery collection bin for safe deposit of batteries without assistance from a trained associate or battery handler and without the need to tape, wrap, encase, or otherwise secure individual batteries to ensure safety during storage and transport. Further, the disclosed embodiments exhibit increased safety by precluding the need for human interaction with potentially volatile or unstable batteries and/or fire suppressant materials to ensure safe handling, storage, and transportation of batteries for disposal or recycling. Relatedly, the disclosed embodiments provide a safe, robust system for battery collection that can include further features to prevent unwanted human interaction with the system, in some cases limiting user interaction to deposit of individual batteries or devices.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
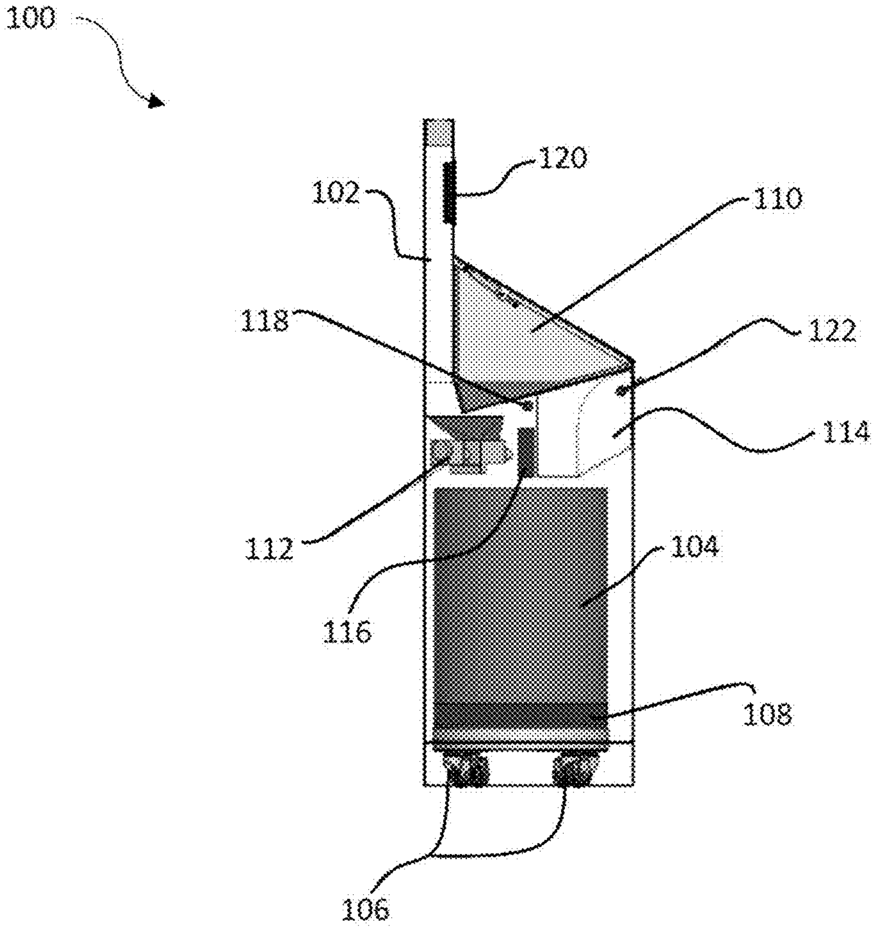
FIG. 1 illustrates a transparent side view of a battery collection system in accordance with one or more embodiments.

This disclosure describes one or more embodiments of a battery collection system that provides a battery collection bin where consumers can safely deposit, without assistance from a trained associate or handler, batteries and devices for disposal or recycling. For example, in some implementations, the battery collection system utilizes a battery collection bin to receive individual batteries and devices from consumers into a closed and monitored enclosure. Further, in some embodiments, the battery collection system determines, based on a fill level, volume, or weight of a transport drum upon deposit of a battery (or a detected size of the deposited battery), a measure of fire suppressant to be dispersed over the deposited battery to prevent thermal events caused, for example, by interaction between batteries and/or devices within the transport drum.

In some embodiments, for example, a battery classification system receives, from one or more sensors, signals indicating a number of objects deposited within a battery collection bin, a fill level, volume, and/or a weight of the battery collection bin. Also, the battery collection system can determine a measure of fire suppressant to dispense based at least one of the fill level, volume, or weight of the battery collection bin and/or a quantity, volume, or weight of the object(s) deposited therein. In response, the battery collection system can dispense, from a fire suppressant cartridge or an internal basin of the battery collection bin, the determined measure of fire suppressant and provide, for display on a client device associated with the battery collection bin, an indication of the number of objects deposited within the battery collection bin and/or the fill level, volume, or weight thereof.

Further, in some embodiments, the battery collection system further determines, in response to receiving signals indicating the fill level, volume, or weight of the battery collection bin, that the fill level, volume, or weight has reached a threshold fill level, volume, or weight, then provides, for display on the client device associated with the battery collection bin, an indication that the threshold fill level, volume, or weight is reached and secures one or more access doors to restrict access to the battery collection bin. Also, in one or more embodiments, the battery collection system determines, in response to receiving signals indicating an volume, weight, or fill level of fire suppressant available for dispersal, that an amount of fire suppressant available falls below a threshold value, then provides, for display on the client device associated with the battery collection bin, an indication that insufficient fire suppressant is available and/or secures one or more access doors to restrict access to the battery collection bin.

Additionally, one or more embodiments of an apparatus for collecting batteries includes a battery collection bin comprising an enclosure configured to receive and secure a transport drum for storing and transporting deposited batteries and devices. Also, the apparatus comprises a chute operable to direct deposited batteries or devices into the transport drum when positioned within the enclosure or bin. Further, in some embodiments, a removeable fire suppressant cartridge or an internal fire suppressant basin is disposed above the transport drum and associated with a fire suppressant dispensing mechanism configured to selectively dispense fire suppressant from the fire suppressant cartridge or the internal fire suppressant basin into the transport drum when a battery is deposited therein via the chute. In addition, in some embodiments, the apparatus further includes one or more sensors configured to determine one or more of a fill level, volume, or weight of the transport drum within the enclosure, thermal properties within the enclosure, carbon dioxide levels within the enclosure, a number of batteries or devices deposited within the transport drum within the enclosure, and/or a volume, weight, or fill level of undispersed fire suppressant within the fire suppressant cartridge or the internal fire suppressant basin.

Additionally, one or more embodiments of the battery collection bin include one or more mechanisms for ensuring that no fire suppressant is spilled when filling the internal fire suppressant basin. For example, one or more embodiments of the battery collection bin can include jug mounting brackets to help ensure that a jug is not dropped during filling. Furthermore, one or more embodiments of the battery collection bin can include an inlet cover to prevent dust or fire suppressant particles from escaping from the battery collection bin.

Thus, the disclosed embodiments provide for convenient and safe depositing of batteries and devices without assistance from trained personnel. Indeed, the disclosed systems can accurately and efficiently detect deposits of individual batteries or devices and determine measures of fire suppressant needed for thermal event prevention. By intelligently dispensing fire suppressant in response to each deposited battery, the disclosed systems can accept and safely handle virtually anything that an unsupervised consumer might deposit, including damaged lithium-ion batteries or devices and other types of potentially volatile batteries. For instance, by dispensing fire suppressant in response to individual deposits, the disclosed systems can proactively prevent thermal events. Additionally, should a thermal event occur, disclosed systems can prevent propagation thereof to other batteries and/or devices stored within a battery collection bin (e.g., by dispensing fire suppressant to deprive oxygen to the event).

Accordingly, the disclosed battery collection systems provide many advantages and benefits over conventional systems and methods. For example, by utilizing secure and closed environment into which batteries and devices may be deposited, the disclosed embodiments enable consumers to deposit batteries and devices safely without assistance from trained personnel and with minimal effort. Indeed, consumers can safely deposit one or more batteries or devices by simply inserting each battery through a chute of a battery collection bin provided, for example, near the front of a convenience store or grocery market. In addition, battery collection bins according to one or more embodiments can be provided both indoors (e.g., inside of a convenience store or supermarket) and outdoors (e.g., in front of a gas station or other storefront). Indeed, in some embodiments, a tamper-proof and secure battery collection bin can be provided at a location that provides consumers with 24-hour access.

Furthermore, by utilizing an automated process for determining measures of fire suppressant to be dispersed in response to individual battery deposits, the disclosed systems improve efficiency and safety relative to conventional systems. Specifically, the disclosed embodiments intelligently analyze signals from one or more sensors to determine a measure of fire suppressant to be dispersed in order to effectively prevent thermal events. Also, the disclosed embodiments can further prevent mishaps by monitoring and reacting to fill levels of the battery collection bin and of the fire suppressant available therein to prevent overfill of the enclosure and/or unavailability of fire suppressant.

As illustrated by the foregoing discussion, the present disclosure utilizes a variety of terms to describe features and advantages of the disclosed systems. Additional detail is now provided regarding the meaning of such terms. For example, as used herein, the term "fire suppressant" refers to a material utilized for prevention of fires related to volatile materials, such as metals, combustible liquids, or lithium-ion batteries. For example, in some implementations, a fire suppressant can include a mineral-based extinguishing agent, such as Vermiculite, Perlite, Expanded Clay, Expanded Polystyrene (EPS), foam glass, fire resistant or insulating fibers and papers, and other fire, heat, and/or smoke suppressant compounds.

Additional detail will now be provided in relation to illustrative figures portraying example embodiments and implementations of the disclosed methods, apparatuses, and systems. For instance, FIG. 1 illustrates a battery collection system 100 according to one or more embodiments. Specifically, FIG. 1 illustrates a transparent side view of the battery collection system 100, such that various components of the battery collection system 100 are visible for illustrative purposes.

As shown in FIG. 1, the battery collection system 100 comprises a battery collection bin 102 with an enclosure sized and configured to receive a transport drum 104 for storing and transporting deposited batteries and/or devices. In some embodiments, the battery collection bin 102 is configured to receive a variety of drums or similar containers, ranging, for example, from 16 gallons to 55 gallons or more. As illustrated, the transport drum 104 is movable via a set of casters 106 disposed on a bottom surface of the transport drum 104. In alternative embodiments, the transport drum 104 does not include casters 106. In such embodiments, a barrel dolly is provided for relocating the transport drum 104, such as but not limited to the various examples described below in relation to FIGS. 2A-2B, 3A-3B, 7A-7D, 8, 10B, 11A-11B, and 20A-20B.

In some embodiments, the transport drum 104 comprises a steel or other durable material of like durability for safe and secure storage and/or transportation of deposited batteries and other devices. In one or more embodiments, the transport drum 104 is preloaded with an initial measure of fire suppressant 108 to ensure that the first battery deposited encounters a buffer of fire suppressant material before the battery collection system 100 disperses any additional measure of fire suppressant in response to the first deposit. Alternatively, in some embodiments, the battery collection bin 102 is configured to deposit the initial measure of fire suppressant 108 upon installation of the transport drum 104.

In one or more embodiments, the battery collection system 100 also comprises a removable cartridge 110 containing fire suppressant. As shown in FIG. 1, for example, the battery collection bin 102 is configured to receive and secure the removable cartridge 110. With the removable cartridge 110 loaded into the battery collection bin 102, the battery collection system 100 can disperse fire suppressant into the transport drum 104 using a dispensing mechanism 112. In alternative implementations, the battery collection bin includes an internal fire suppressant basin that is fillable rather than a battery collection bin 102 for storing a removable cartridge 110, as described in more detail below. In any event, when a battery is inserted through a feed chute 114 of the battery collection bin 102, the battery collection system 100 disperses a measure of fire suppressant from the cartridge 110 via the dispensing mechanism 112.

Moreover, in some embodiments, the battery collection system 100 actively monitors conditions within the battery collection bin 102, detecting and recording states such as fill level, volume, or weight of the transport drum 104 (or its contents) or detecting quantities, sizes, and/or weights of objects as they are deposited within battery collection bin 102. For example, the battery collection bin 102 includes a sensor array 116 for detecting a battery deposit and determining fill level, volume, or weight of the transport drum 104. Accordingly, in one or more embodiments, the battery collection system 100 receives signals from the sensor array 116 to determine a number of batteries and/or devices deposited in the battery collection bin 102 and/or a current fill level, volume, or weight of the transport drum 104. In response, the battery collection system can determine a measure of fire suppressant to disperse over the deposed battery to prevent thermal events and ensure safe storage and transportation of the batteries and devices within the transport drum 104.

In some embodiments, the battery collection system 100 includes additional sensors and/or devices for monitoring the contents of the transport drum 104. As shown, the battery collection bin 102 comprises a sensor(s) 118 for detecting smoke, detecting temperature, and/or identifying levels of CO2 within the enclosure of the battery collection bin 102 and/or the transport drum 104. In some implementations, for example, when the battery collection system 100 detects smoke, an elevated temperature, and/or an elevated level of CO2 via the sensor(s) 118, the battery collection system 100 dispenses a remainder of fire suppressant within the cartridge 110 (or within an internal basin of the battery collection bin) into the transport drum 104 to prevent or extinguish a fire or other thermal/chemical event. Alternatively or additionally, in some embodiments, the battery collection system 100 comprises additional fire suppression measures for response to thermal events, such as but not limited to dry chemical clean agent, commercial kitchen, or CO2 suppression systems. Further, in some embodiments, the battery collection bin 102 comprises a ventilation system for relieving pressure within the enclosure thereof, as well as a warning system or alarm for notifying nearby persons and local or remote operators and/or emergency personnel of a thermal event or emergency.

As also shown in FIG. 1, in some embodiments, the battery collection bin 102 comprises a display screen 120 (e.g., an integrated LCD screen). For example, the battery collection system 100 can provide, via the display screen 120, various notifications including but not limited to a general system status (e.g., open, closed, out of operation), a current fill level, volume, or weight of the transport drum 104, an indication of remaining fire suppressant within the cartridge 110, a number, volume, and/or weight of batteries and/or devices currently deposited, a current temperature, current CO2 levels, and so forth. Furthermore, in some embodiments, a display (such as the display screen 120) can be used for marketing, advertising, and/or presentation of statistics related to battery collection and the battery collection network.

Alternatively or additionally, the battery collection system 100 may provide such notifications via alternative client devices associated with the battery collection system, such as but not limited to a tablet, a computer, a mobile device, and so forth for remote or local monitoring of the battery collection system 100. Relatedly, the battery collection system 100 can include connectivity via Wi-Fi, Bluetooth, Internet, cellular modem, or the like to allow for remote monitoring of bin conditions, such as fill level, volume, or weight. Remote monitoring, in some implementations, allows for additional transport drums and suppressant cartridges or refill jugs to be sent as the battery collection bin 102 reaches a nearly full fill level, volume, or weight.

Moreover, in one or more embodiments, the battery collection bin 102 also comprises a feed chute lock 122 operable to secure the feed chute 114 in a locked position to prevent deposit of additional batteries or devices. For instance, in some implementations, the battery collection system 100 can determine that the fill level, volume, or weight of the transport drum 104 has reached a threshold level (e.g., 90 percent full) and, in response, can cause the feed chute lock 122 to prevent a door of the feed chute 114 from opening. Also, in some implementations, should power to the battery collection bin 102 be lost, the feed chute lock 122 can automatically engage to restrict access or deposits while the system is unable to disperse fire suppressant.

Figure 2A:
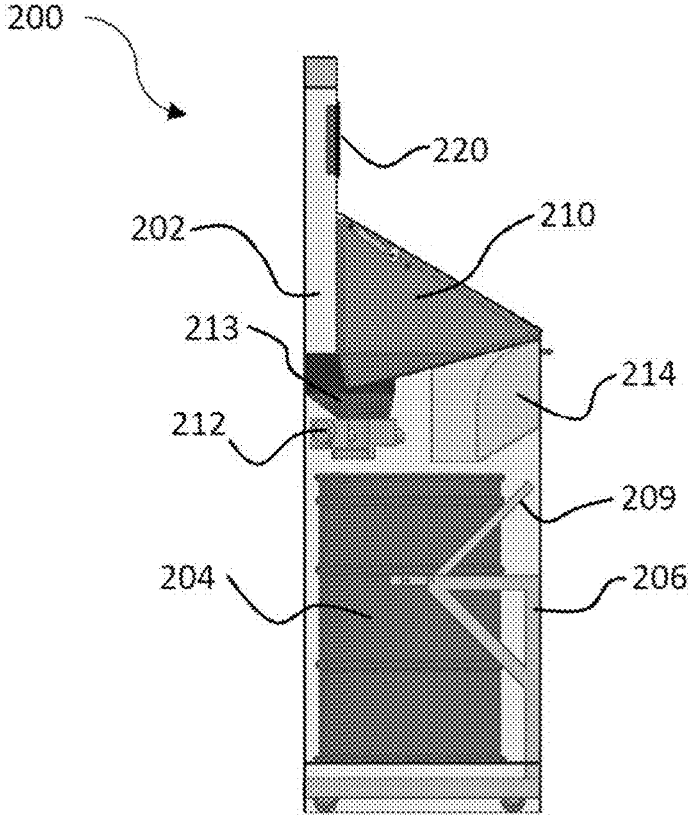
FIG. 2A illustrates a transparent side view of another battery collection system in accordance with one or more embodiments.
Figure 2B:
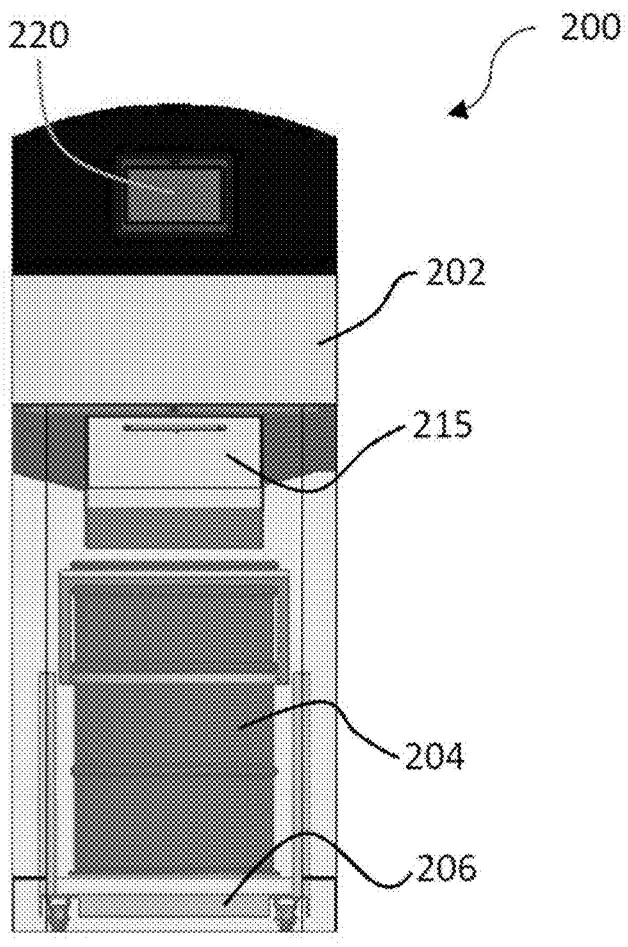
FIG. 2B illustrates a transparent front view of the battery collection system of FIG. 2A.

As mentioned previously, the disclosed embodiments can include a configuration to work with a specially configured barrel dolly to transport and/or position transport drums within a battery collection bin. For example, FIGS. 2A-2B illustrate an embodiment of a battery collection system 200, according to one or more embodiments, with many similar or identical components to the battery collection system 100 of FIG. 1, albeit with a configuration that allows for positioning of a transport drum 204 within a battery collection bin 202 of the battery collection system 200 via a barrel dolly 206. As shown, the barrel dolly 206 includes a lifting mechanism 209 similar to a pallet jack for transporting and positioning the transport drum 204 within an enclosure of the battery collection bin 202. As illustrated, the barrel dolly 206 fits within the battery collection bin 202 for secure storage thereof. In alternative embodiments, a barrel dolly can be utilized to position a transport drum within a battery collection bin and then be subsequently removed, leaving the transport drum inside.

As shown, the battery collection bin 202 includes a removable cartridge 210 of fire suppressant, a dispensing mechanism 212 for selectively dispensing fire suppressant from the removable cartridge 210 into the transport drum 204, and a hopper 213 for directing the fire suppressant into the dispensing mechanism 212. As mentioned previously, in some embodiments, the battery collection bin 202 can include an internal basin in place of the removable cartridge 210, wherein the internal basin is fillable to provide fire suppressant for dispersal via the dispensing mechanism 212 (e.g., as described below in relation to FIGS. 9A-10B and 13A-13C).

As also shown, the battery collection bin 202 includes a feed chute 214 having a bin funnel for directing deposited batteries or devices into the transport drum 204. In one or more implementations, the bin funnel mitigates impact-caused thermal runway events by guiding deposited objects into the transport drum 204 with a relatively low velocity. Also, in some embodiments, the bin funnel of the feed chute 214 is monitored by a jam sensor (e.g., an ultrasonic sensor) that performs object counting and triggers alerts for immediate maintenance if an object is blocking the bin funnel. Also, in one or more embodiments, the feed chute 214 comprises non-conductive materials for preventing short-circuit of deposited batteries or devices passing through the feed chute 214.

In addition, the battery collection bin 202 includes a feed chute door 215 that provides access to the feed chute 214, as discussed above in relation to FIG. 1, the feed chute door 215 can be automatically or manually locked when the transport drum 204 has reached a threshold fill level, volume, or weight. Further, in some embodiments, the feed chute door 215 is configured to restrict access to the interior of the battery collection bin. In some embodiments, for example, the feed chute door 215 comprises a tray in which a battery can be placed, wherein the tray blocks access to the interior of the battery collection bin 202 when the feed chute door 215 is in an open position, such that a deposited battery placed within the tray will fall into the transport drum 204 when the feed chute door 215 is subsequently closed.

Further, in some embodiments, the feed chute door 215 is sized and configured to receive batteries and devices of a predetermined size and/or shape. Indeed, embodiments can include a feed chute door of various sizes, shapes, and designs to accommodate specific use cases. For example, anticipated sizes and shapes of batteries and devices may vary between a battery collection bin placed at a home improvement store, which may anticipate deposits of various power tool batteries, and a sporting goods store, which may anticipate deposits of relatively larger and elongated batteries typically used in e-bikes. Moreover, some embodiments include a feed chute door and/or tray sized and configured to prevent deposit of undesirable objects into the battery collection bin, such as car batteries or similarly volatile objects.

As illustrated, the battery collection bin 202 also comprises a display screen 220 for displaying notifications to users of the battery collection system 200. As similarly mentioned in relation to battery collection system 100 of FIG. 1 above, the battery collection system 200 can provide, via display screen 220, indications with respect to current fill level, volume, or weight of the transport drum 204 and/or the removable cartridge 210 of internal fire suppressant basin, as well as notifications with respect to CO2 and/or heat levels within the battery collection bin 202.

Figure 3A:
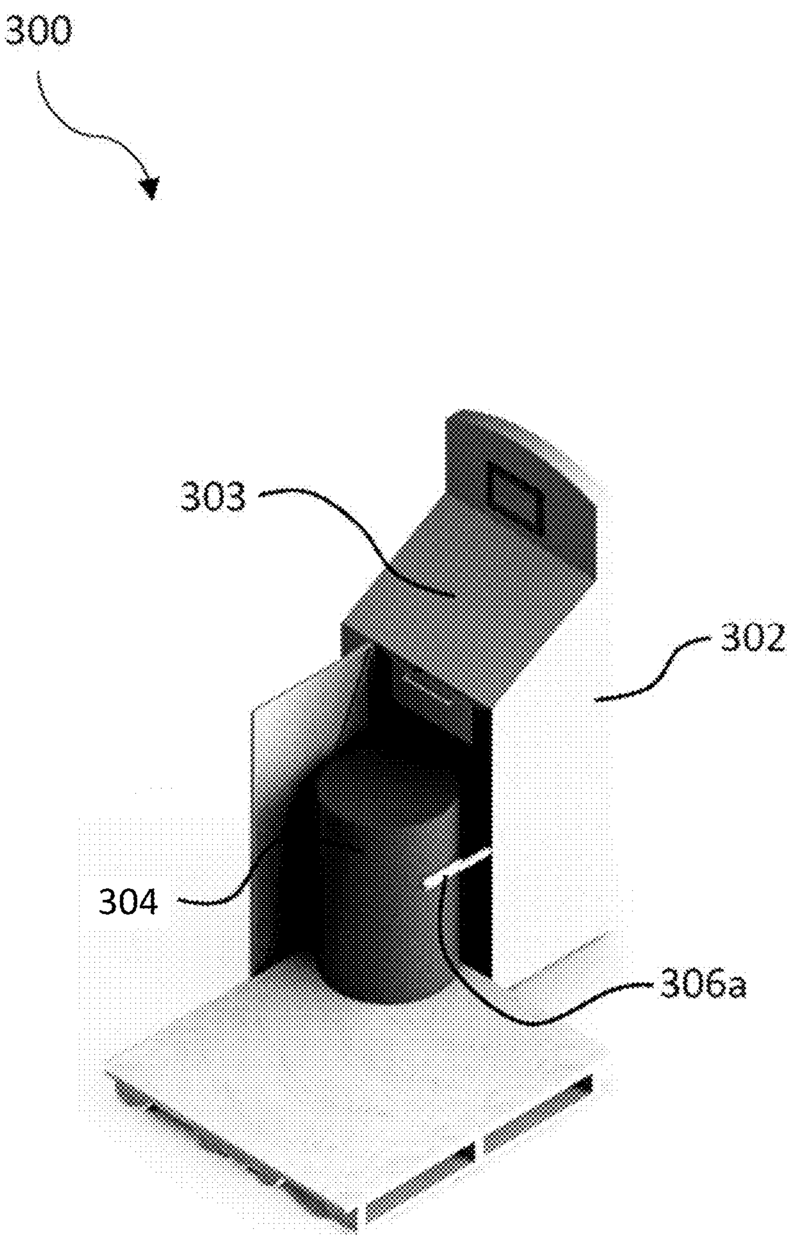
FIG. 3A illustrates a perspective view of a battery collection system with a slide loading mechanism in accordance with one or more embodiments.
Figure 3B:
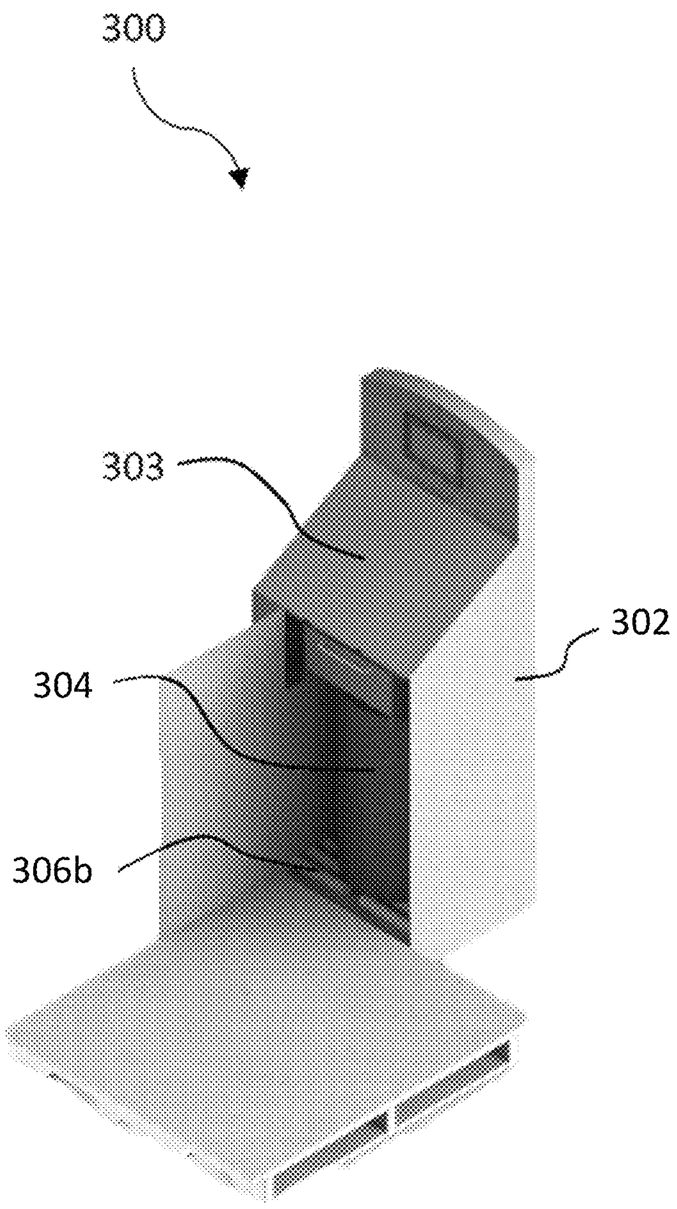
FIG. 3B illustrates a perspective view of a battery collection system with a drum roller loading mechanism in accordance with one or more embodiments.

As mentioned previously, the disclosed embodiments can include various systems, apparatus, and methods for transporting and/or positioning transport drums within a battery collection bin. For example, FIGS. 3A-3B show a transport drum 304 being loaded into a battery collection bin 302 of a battery collection system 300 according to one or more embodiments. For instance, FIG. 3A shows a slide loading mechanism 306*a* configured to be slidably secured to one or more sides of the transport drum 304. With the slide loading mechanism 306*a* secured to the transport drum 304, an operator (i.e., a user) can push the transport drum 304 into an interior of the battery collection bin 302 by causing a bracket of the slide loading mechanism 306*a* holding the transport drum 304 to slide along rails of the slide loading mechanism 306*a*. In alternative or addition to the slide loading mechanism 306*a*, the battery collection system 300 can include a series of drum rollers 306*b*, as shown in FIG. 3B. As shown, the drum rollers 306*b* are configured to enable an operator to glide the transport drum 304 into the interior of the battery collection bin 302. As shown, in some implementations, the slide loading mechanism 306*a* and/or drum rollers 306*b* are operable to slide the transport drum 304 directly onto a pallet without having to lift the transport drum 304.

In some embodiments, a battery collection bin comprises a top surface that discourages or prohibits placement of objects (e.g., clutter, trash, or undeposited batteries) on top of the bin, such as an angled or curved surface that descends towards the ground. As shown in FIGS. 3A-3B, for example, the battery collection bin 302 comprises an inclined surface when a cartridge door 303 is closed and/or the battery collection bin 302 is otherwise secured.

Figure 4C:
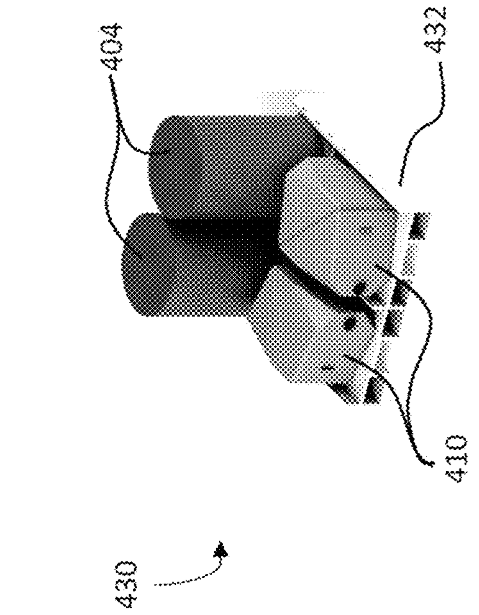
FIG. 4C illustrates a perspective view of a shipping pallet with multiple fire suppressant cartridges and storage barrels in accordance with one or more embodiments.
Figure 4B:
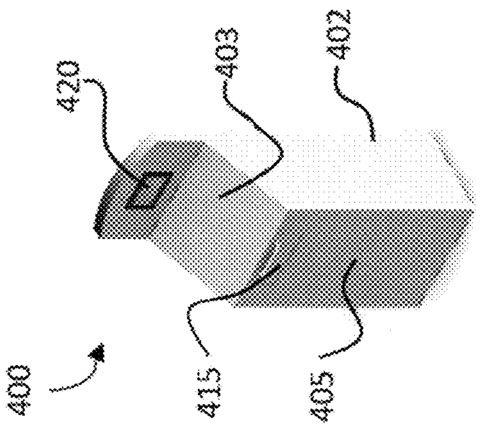
FIG. 4B illustrates a perspective view of the battery collection system of FIG. 4A with latches secured and ready to receive batteries or devices in accordance with one or more embodiments.
Figure 4A:
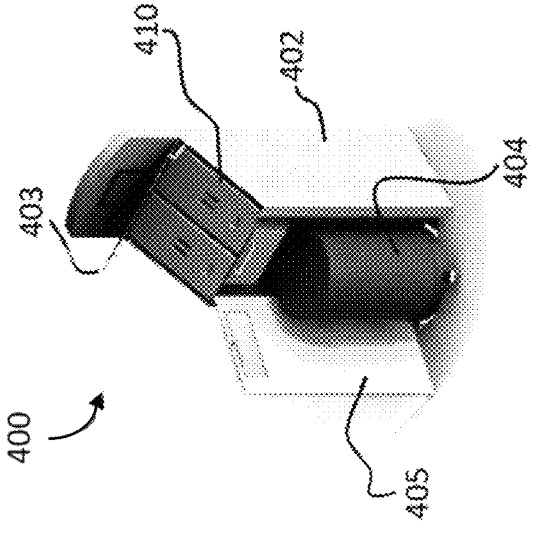
FIG. 4A illustrates a perspective view of a battery collection system being loaded with fire suppressant cartridges and a storage barrel in accordance with one or more embodiments.

FIGS. 4A-4C illustrate another battery collection system 400 according to one or more embodiments. As shown, the battery collection system 400 comprises a battery collection bin 402 configured to accommodate two removable cartridges 410 containing fire suppressant. Indeed, embodiments can include various shapes and sizes of removable cartridges of fire suppressant. Also, as mentioned, embodiments can include fire suppressant containers configured to load an internal basin of the battery collection basin with fire suppressant via one or more inlets thereof.

As shown in FIG. 4A, a cartridge door 403 is opened to remove and/or install the removable cartridges 410 within the battery collection bin 402. Also, a bin access door 405 is shown in an open position for removing and/or installing a transport drum 404 within the battery collection bin 402.

Relatedly, FIG. 4B shows the cartridge door 403 and the bin access door 405 in a closed position, such that the battery collection bin is in a condition to receive batteries and devices through a feed chute door 415. In some implementations, the cartridge door 403 and the bin access door 405 are secured (locked) to prevent access or tampering by consumers. In some embodiments, the bin access door 405 includes a storage space for placement of a transport drum lid. With the battery collection bin 402 prepared to receive batteries and devices from consumers, a display screen 420 can indicate to consumers that the battery collection bin 402 is operable and, in some implementations, may include a prompt with instructions for consumers to follow.

FIG. 4C shows a transport system 430 for shipping transport drums 404 and cartridges 410 according to one or more embodiments. As shown, a pallet 432 is provided with two transport drums 404 and two cartridges 410 for use with the battery collection bin 402 of FIGS. 4A-4B.

As mentioned previously, the disclosed embodiments can include removable cartridges containing fire suppressant and a corresponding dispensing mechanism for dispensing fire suppressant in response to individual battery deposits. For example, FIGS. 5A-5B illustrate a fire suppressant dispensing system 500 comprising a removable cartridge 510 containing a fire suppressant 508 and a dispensing mechanism 512 according to one or more embodiments.

Figure 5A:
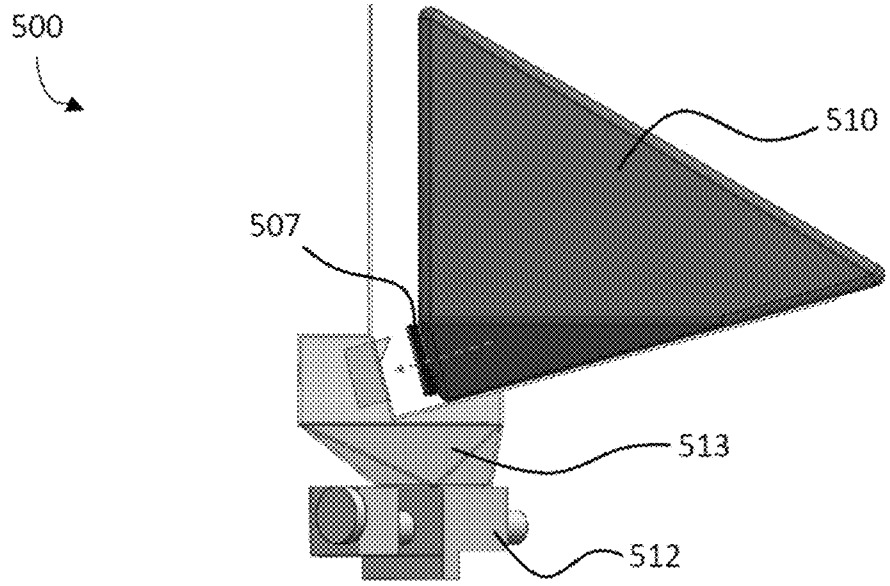
FIG. 5A illustrates a side view of a fire suppressant cartridge being loaded within a fire suppressant dispensing apparatus in accordance with one or more embodiments.
Figure 5B:
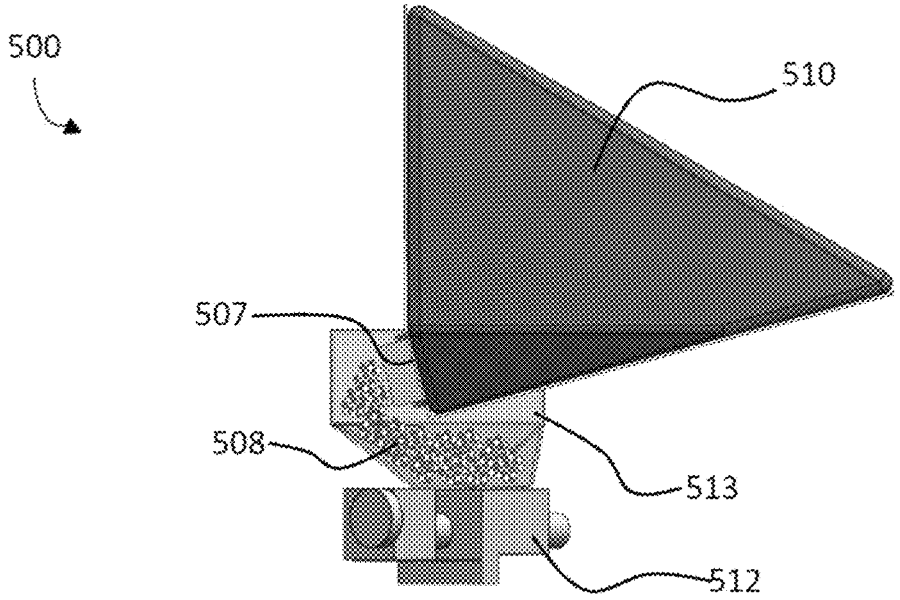
FIG. 5B illustrates a side view of the fire suppressant dispensing apparatus of FIG. 5A dispensing fire suppressant from the fire suppressant cartridge in accordance with one or more embodiments.

As shown in FIG. 5A, an outlet 507 of the removable cartridge 510 of the fire suppressant 508 coordinates with an inlet of a fire suppressant hopper 513. As shown in FIG. 5B, with the outlet 507 of the removable cartridge 510 inserted and secured to the hopper 513, the fire suppressant 508 fills the hopper 513 and the hopper 513 directs the fire suppressant 508 toward the dispensing mechanism 512 for selective disbursement of the fire suppressant 508 into a corresponding transport drum within a battery collection bin. In some embodiments, the dispensing mechanism 512 is operated by a low voltage motor (e.g., a 12-volt DC stepper motor) configured to selectively dispense a measured amount of the fire suppressant 508. In some embodiments, each removable cartridge 510 is vacuum sealed to an inlet of the hopper 513 to ensure retention of the fire suppressant 508 within a closed environment.

Moreover, in one or more embodiments, the fire suppressant dispensing system 500 includes a dispensing mechanism 512 comprising an augur which in turn is fed by the hopper 513. In some embodiments, for example, the dispensing mechanism 512 comprises a sliding compartment operable by a motor to open the compartment to release the fire suppressant 508 for a determined number of seconds to dispense a particular measure of the fire suppressant 508 into a transport drum positioned below the dispensing mechanism 512. In other embodiments, a fire suppressant dispensing system comprises an interval system where, at multiple predetermined thresholds based on a total volume of a corresponding transport drum, a nozzle pierces a cover of a single cartridge of a series of cartridges to release fire suppressant into the transport drum.

In one or more implementations, the fire suppressant dispensing system 500 allows for dispensing and even distribution of fire suppressant into a transport drum within a battery collection bin, amongst collected batteries and devices, without user intervention. In some implementations, after an object is deposited into the bin, the fire suppressant dispensing system 500 dispenses a controlled amount of fire suppressant into the transport drum based on thresholds derived from the sensed object volume, weight, or quantity. Also, in some implementations, if a sensor of the bin collection system identifies a temperature spike or detects smoke, the fire suppressant dispensing system 500 fully empties the fire suppressant 508 from within the removable cartridge 510 into the corresponding drum.

Figure 6A:
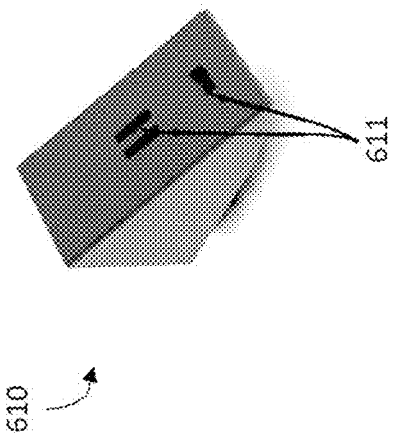
FIG. 6A illustrates a perspective view of a fire suppressant cartridge in accordance with one or more embodiments.
Figure 6B:
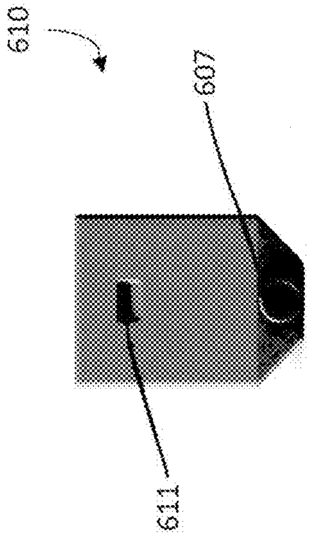
FIG. 6B illustrates a front view of the fire suppressant cartridge of FIGS. 6A and 6C.
Figure 6C:
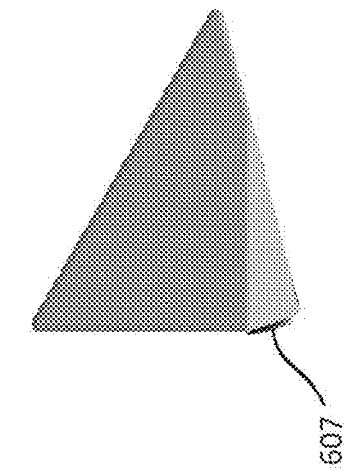
FIG. 6C illustrates a side view of the fire suppressant cartridge of FIGS. 6A and 6B.

Relatedly, FIGS. 6A-6C show various views of a removable cartridge 610 for providing fire suppressant to a battery collection system according to one or more embodiments. As shown, each removable cartridge 610 comprises multiple handles 611 for ease of handling. Also, each removable cartridge 610 includes an outlet 607 configured to coordinate with a corresponding fire suppressant dispersing system of a battery collection bin, such as described above in relation to FIGS. 5A-5B. Cartridges, such as the removable cartridge 610, can be manufactured by a variety of procedures, such as but not limited to 3D-printing, blow molding, and so forth.

In one or more embodiments, the battery collection system includes fire suppressant cartridges that are sealed to keep the fire suppressant free of dust and to prevent tampering or other inadvertent disruptions of the fire suppressant during transit or storage. In some embodiments, the fire suppressant cartridges are refillable, such that a provider or operator can fill the cartridge from a larger source, whether the cartridge be a removable cartridge configured to be positioned within a battery collection bin (e.g., as shown in FIGS. 6A-6C) or a cartridge/jug configured to be emptied into an internal basin of a battery collection bin (e.g., as shown in FIGS. 9A-10B and 13A-13C).

As mentioned previously, the disclosed embodiments can include various systems, apparatus, and methods for positioning transport drums configured to store deposited batteries and other devices. For example, FIGS. 7A-7D illustrate a method for positioning a transport drum 704 onto a pallet 732 utilizing a barrel dolly 706 according to one or more embodiments.

Figure 7A:
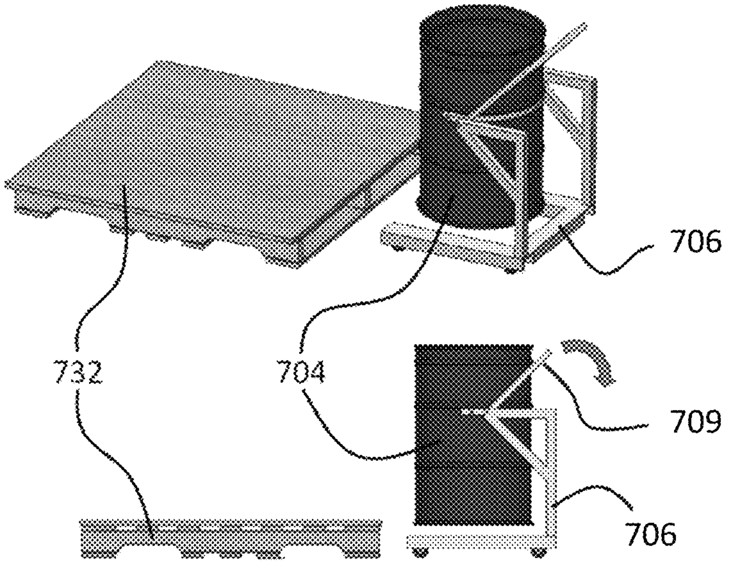
FIGS. 7A-7D illustrate a transport barrel loading mechanism in operation in accordance with one or more embodiments.
Figure 7B:
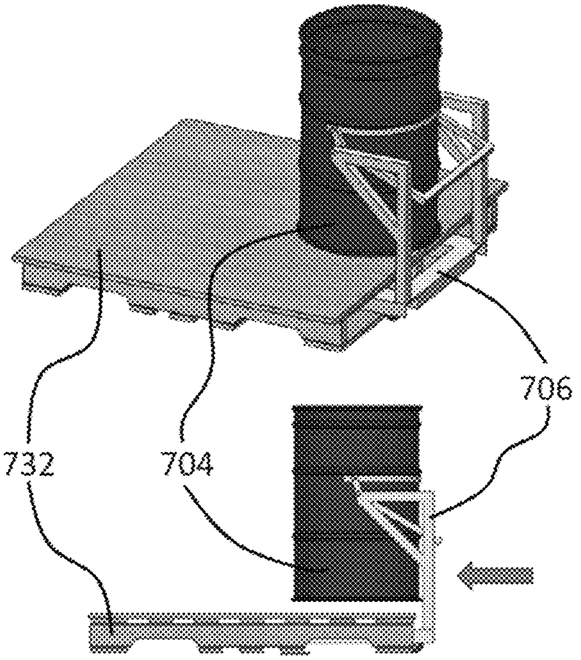
Figure 7C:
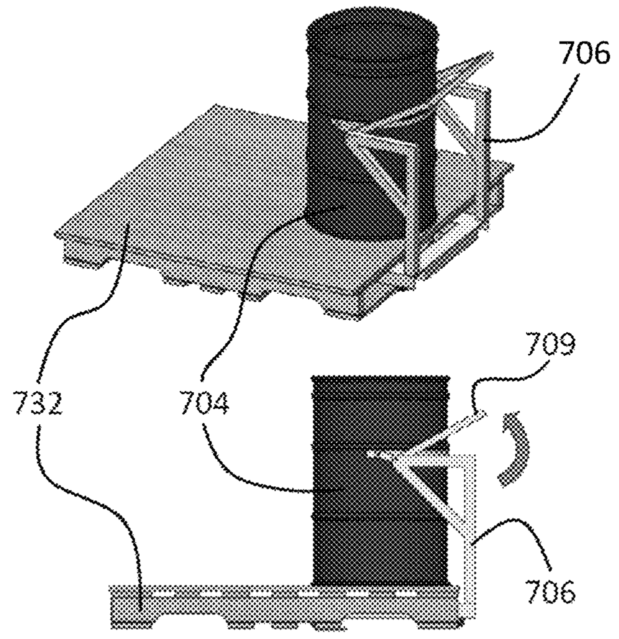
Figure 7D:
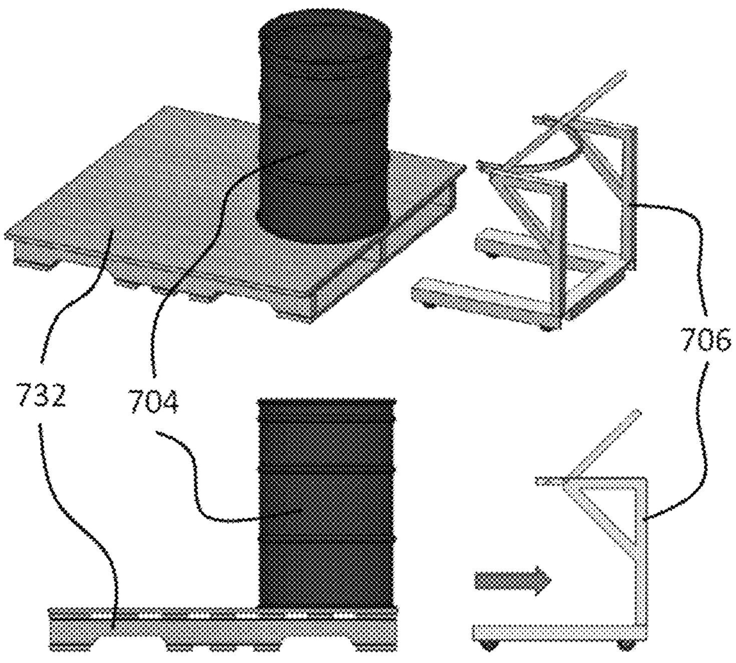

As shown in FIG. 7A, the transport drum 704 is loaded onto the barrel dolly 706 and lifted above the pallet 732 using a jack handle 709 of the barrel dolly 706. Then, as shown in FIG. 7B, the barrel dolly 706 is pushed into position under the pallet 732, such that the transport drum 704 is in position over the pallet 732. As shown in FIG. 7C, the transport drum 704 is lowered onto the pallet 732 using the jack handle 709 of the barrel dolly 706. Finally, as shown in FIG. 7D, the operation is completed by pulling the barrel dolly 706 away from the pallet 732.

Figure 8:
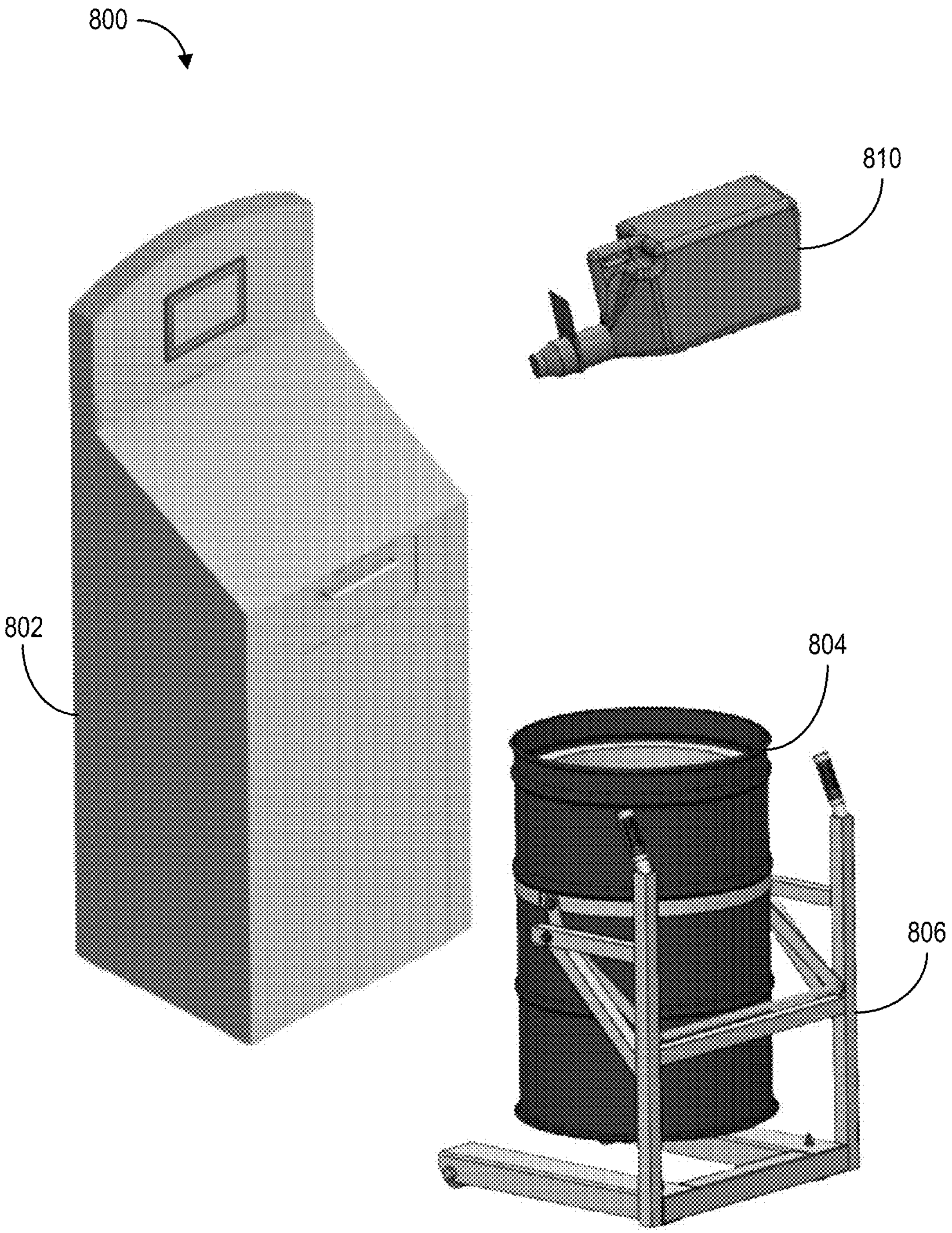
FIG. 8 illustrates a perspective view of a battery collection system with a fire suppressant cartridge and a transport barrel loading mechanism in accordance with one or more embodiments.

FIG. 8 illustrates another exemplary embodiment of a battery collection system 800. As shown, the battery collection system 800 can include various embodiments of a battery collection bin 802, a fire suppressant cartridge or container 810, a transport drum 804, and/or a loading mechanism 806 for the transport drum 804. For example, the battery collection system of FIG. 8 includes an alternative design of a transport dolly configured to securely lift and convey a transport drum to and from the battery collection bin.

Further, FIG. 8 shows an alternative design of a fire suppressant cartridge. As illustrated, the fire suppressant container 810 is configured to carry a prescribed amount of fire suppressant for filling an internal basin of the battery collection bin 802. As shown in FIGS. 9A-10B, for example, the fire suppressant container 810 is configured to coordinate with a port in a battery collection bin for filling an internal basin within the battery collection bin with fire suppressant, rather than inserting and securing the cartridge within the battery collection bin (i.e., as shown in FIGS. 2A, 4A, and 5A-5B).

Figure 9B:
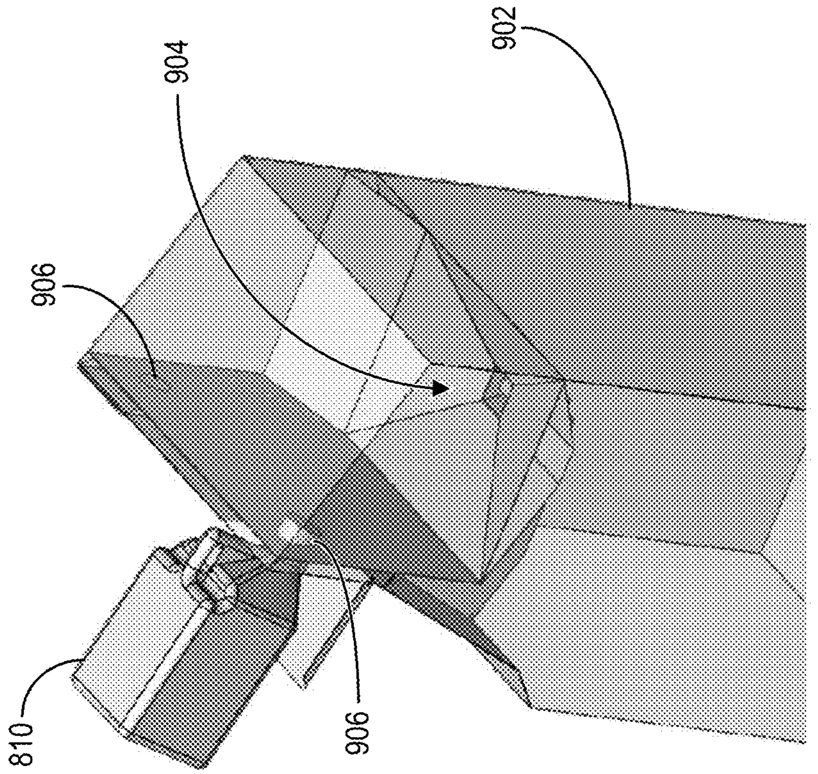
FIGS. 9A-9B illustrate perspective views of a battery collection system being loaded with fire suppressant in accordance with one or more embodiments.
Figure 9A:
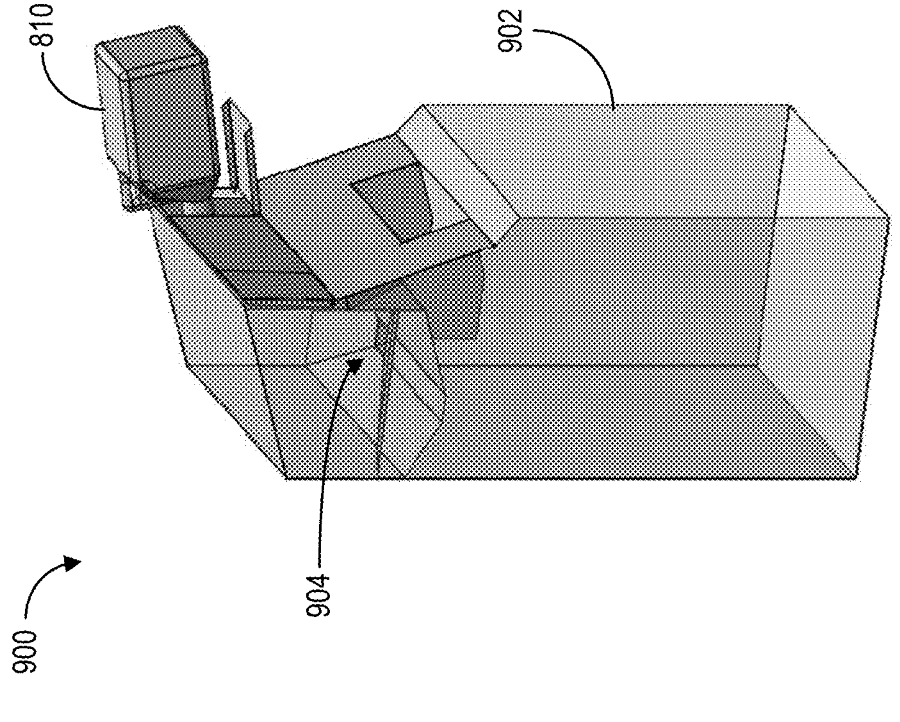

As mentioned above, some embodiments of the battery collection system comprise a basin within a battery collection bin, the basin loadable (i.e., fillable) with fire suppressant for selective dispersal over batteries and/or devices deposited into the battery collection bin. For example, FIGS. 9A-9B illustrate an embodiment of a battery collection system 900 having a battery collection bin 902 with an internal basin 904 configured to receive, store, and direct fire suppressant for dispersal over deposited objects. In particular, FIGS. 9A-9B show the internal basin 904 of the battery collection bin 902 being filled with fire suppressant from the fire suppressant container 810 (e.g., as shown in FIG. 8) through one of multiple inlets 906 above the internal basin 904.

Figure 10B:
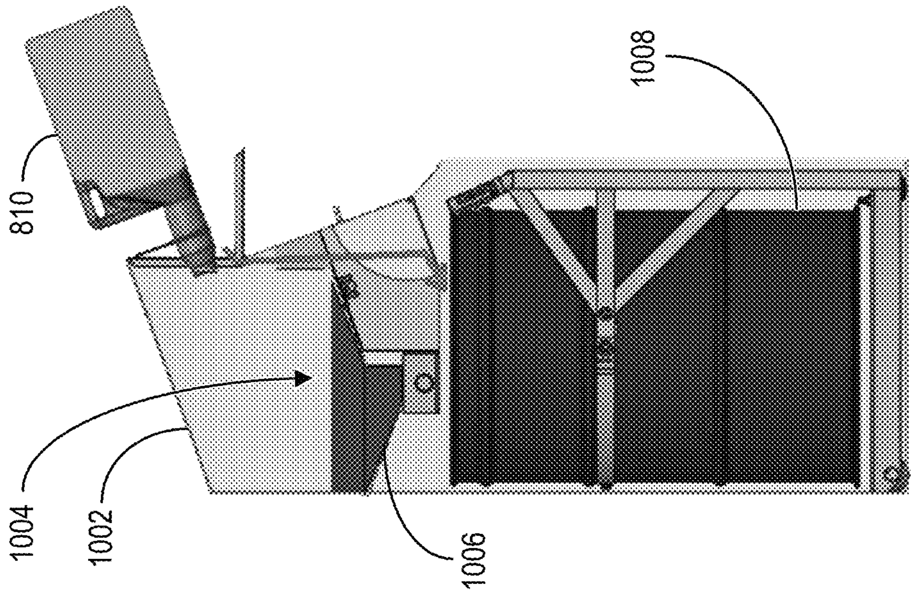
FIG. 10B illustrates a side view of the battery collection system of FIG. 10A.
Figure 10A:
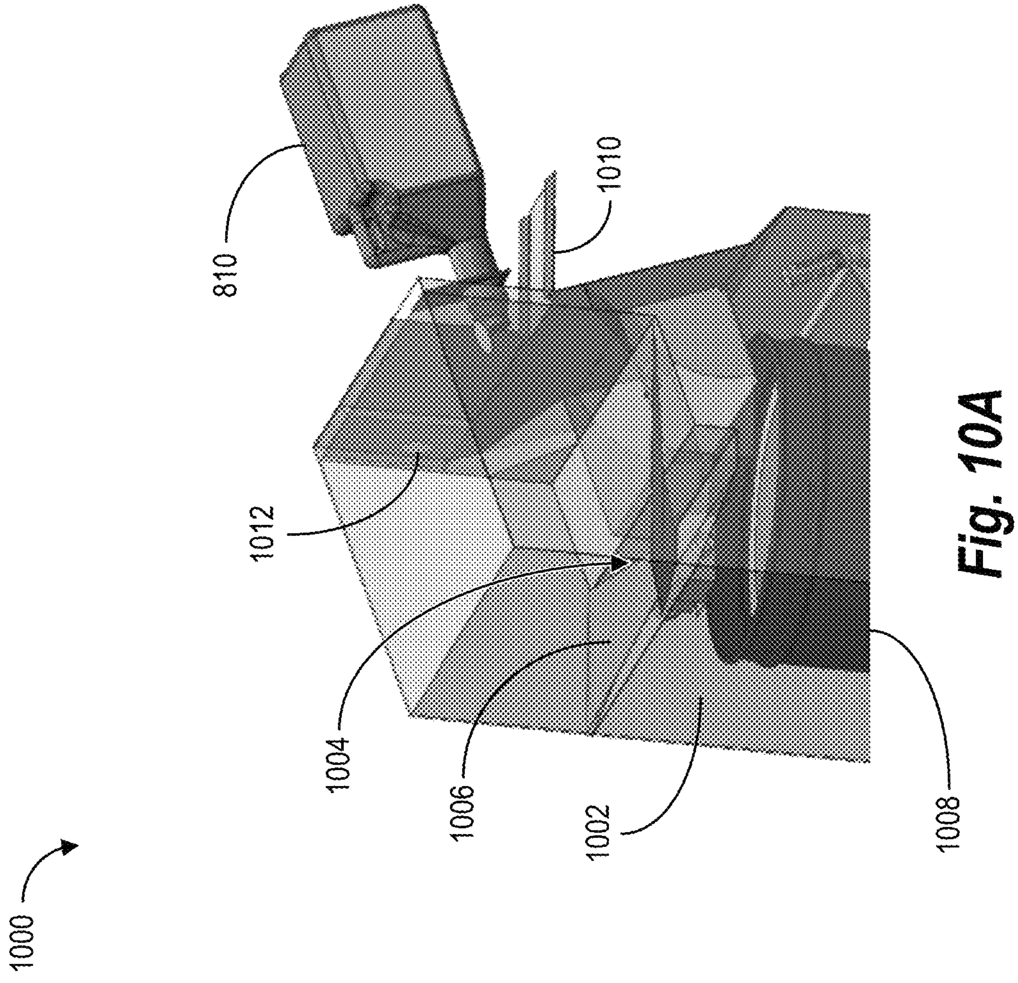
FIG. 10A illustrates a perspective view of a battery collection system being loaded with fire suppressant from a fire suppressant cartridge in accordance with one or more embodiments.

Similarly, FIGS. 10A-10B illustrate an additional embodiment of a battery collection system 1000 being filled with fire suppressant from the fire suppressant container 810 (e.g., as shown in FIG. 8). In particular, FIGS. 10A-10B show a transparent view of a battery collection bin 1002, the battery collection bin 1002 having an internal basin 1004 which feeds into a hopper 1006 for selectively dispensing the fire suppressant into a transport drum 1008 positioned within the battery collection bin 1002. As also shown in FIG. 10B, in some embodiments, the battery collection bin 1002 can include a panel 1010 configured to swing open to provide access to a fill hole 1012 above the internal basin 1004 of the battery collection bin 1002 and to direct any escaping fire suppressant into the transport drum 1008 below.

Figure 11A:
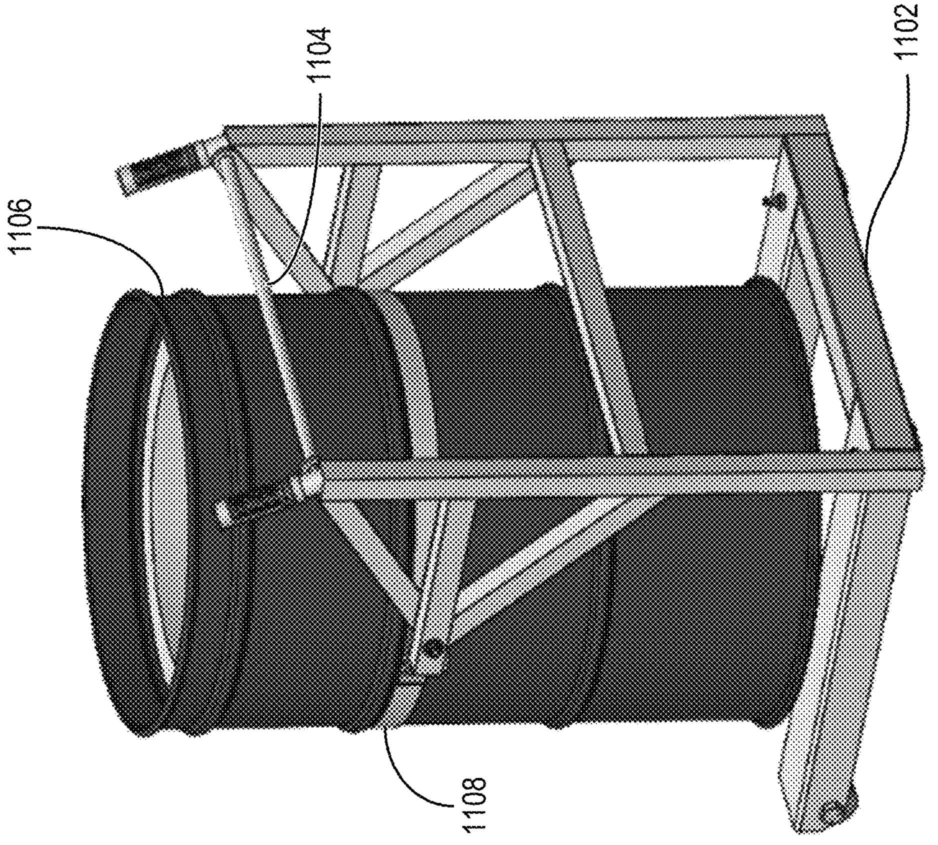
FIG. 11A illustrates a perspective view of a transport barrel loading mechanism in accordance with one or more embodiments.
Figure 11B:
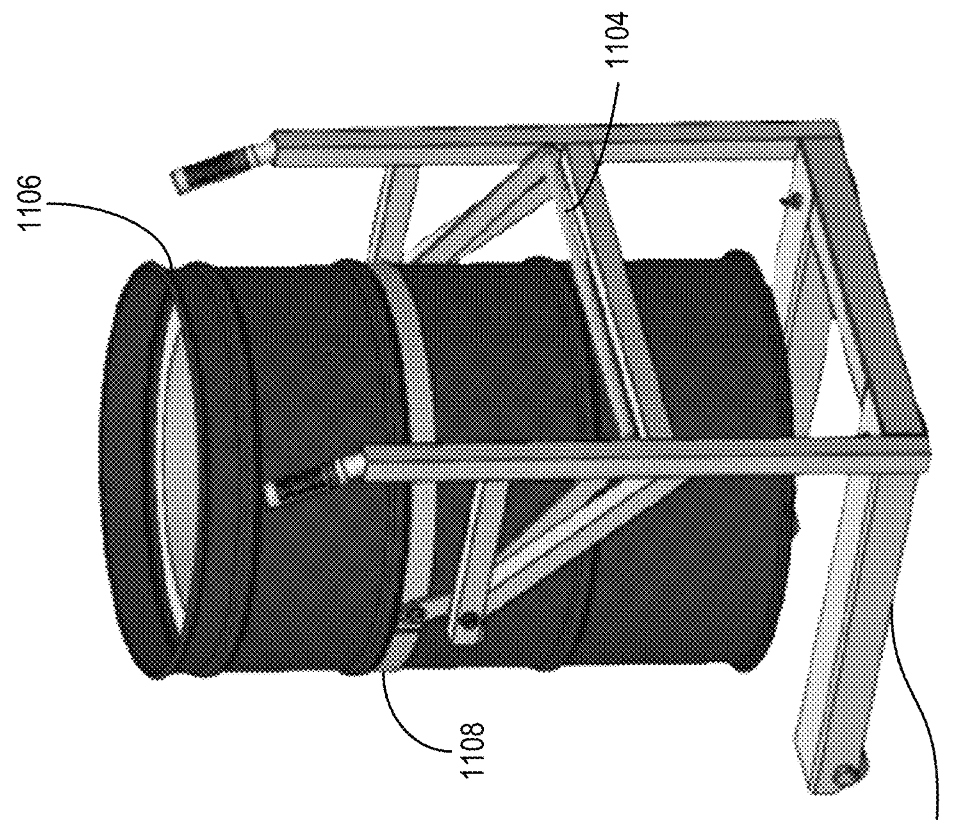
FIG. 11B illustrates a perspective view of the transport barrel loading mechanism of FIG. 11A in operation to lift a storage barrel.

As mentioned previously, embodiments of the battery collection system can include a variety of tool or apparatuses for lifting and transporting transport drums or similar containers. For example, FIGS. 11A-11B illustrate yet another embodiment of a transport drum lifting mechanism or barrel dolly 1102. As shown, the barrel dolly 1102 comprises a lifting mechanism operable by an elongated handle 1104. Accordingly, the barrel dolly 1102 can be configured to lift a transport barrel 1106, whether empty, partially filled or fully loaded, without requiring additional tools or machinery. As also shown in FIGS. 11A-11B, in some embodiments, the barrel dolly 1102 is configured with a barrel strap 1108 securable to an outer surface about the circumference of the transport barrel 1106. As shown, the barrel strap 1108 may provide additional support to the transport barrel 1106 during lifting and transport operations.

Figure 12:
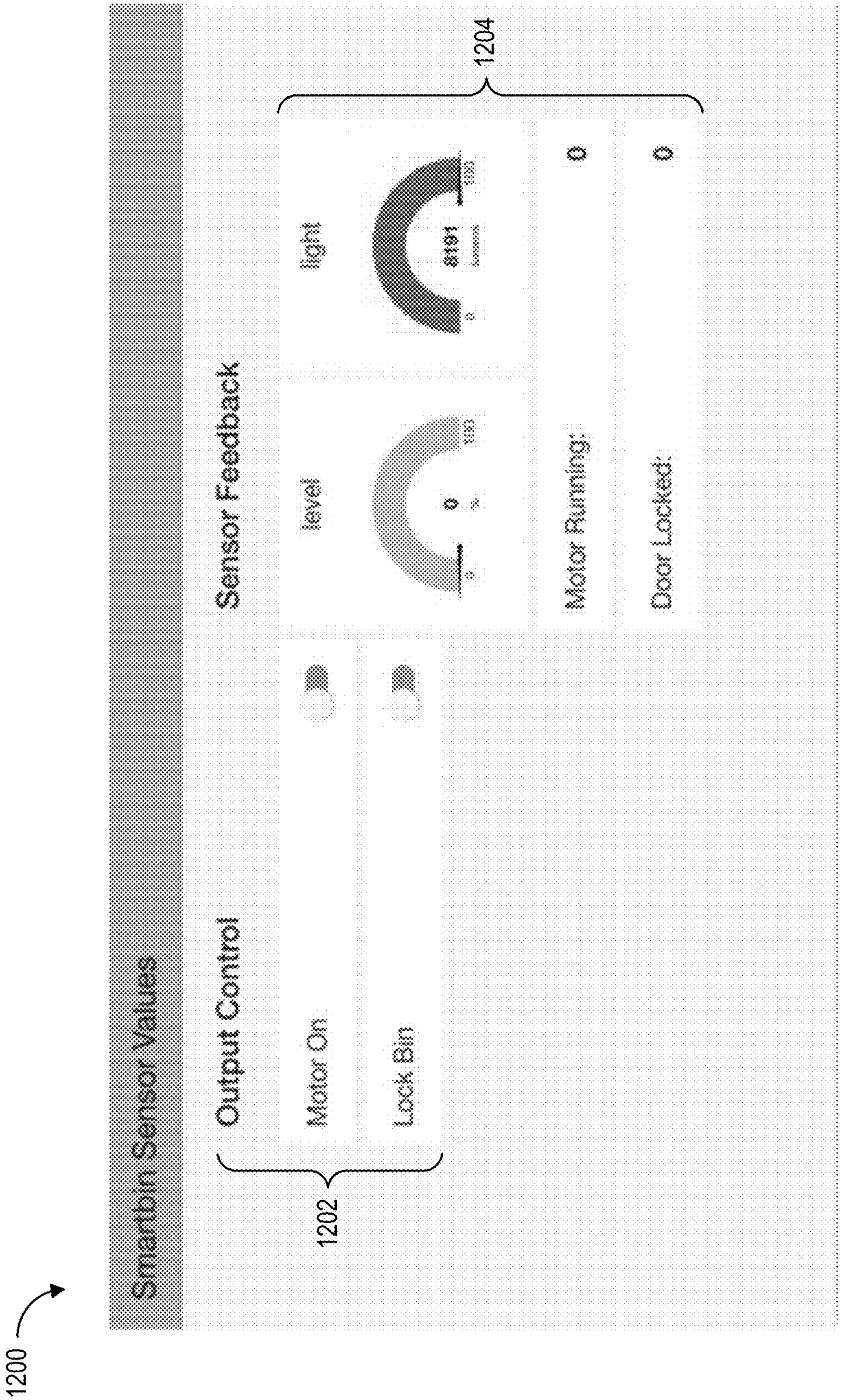
FIG. 12 illustrates a user interface of a battery collection system displaying various information and notifications in relation to a battery collection bin in accordance with one or more embodiments.

As mentioned previously, one or more embodiments of the battery collection system include a display of information and/or notifications regarding the status of one or more battery collection bins. Such a display or user interface can be portrayed via a display screen on the battery collection bin itself, or via a client device, such as but not limited to a personal computer, tablet, or mobile phone. For example, FIG. 12 illustrates an exemplary user interface 1200 for providing controls and notifications to operators. For instance, the user interface 1200 can include controls 1202 for locking one or more doors or access points of the battery collection bin (e.g., a selectable option labelled "lock bin" in FIG. 12) to restrict access thereto. Moreover, in some embodiments, the user interface includes controls 1202 for activating/deactivating various features of the battery collection system, such the auger motor for dispensing fire suppressant (e.g., a selectable option labeled "motor on" in FIG. 12) or any of the various sensors described herein.

As further illustrated in FIG. 12, the display or user interface 1200 can include various notifications or status indicators 1204 for the battery collection system. For instance, a level indicator that graphically illustrates the percent fill level or volume of the battery collection bin is provided. Also, a light indicator is included, which can indicate to an operator whether the chute door is currently opened, or partially opened due to a jam or other issue. In addition, numerical indicators can be included, such as the illustrated "motor running" and "door locked" indications shown in FIG. 12. Accordingly, in some embodiments, the battery collection system can be monitored and/or controlled remotely or locally via a user interface, such as but not limited to the exemplary interface provided in FIG. 12. Moreover, in one or more embodiments, network connectivity is not required for safe and efficient operation of the battery collection system, as the system can operate without human interaction.

Figure 13A:
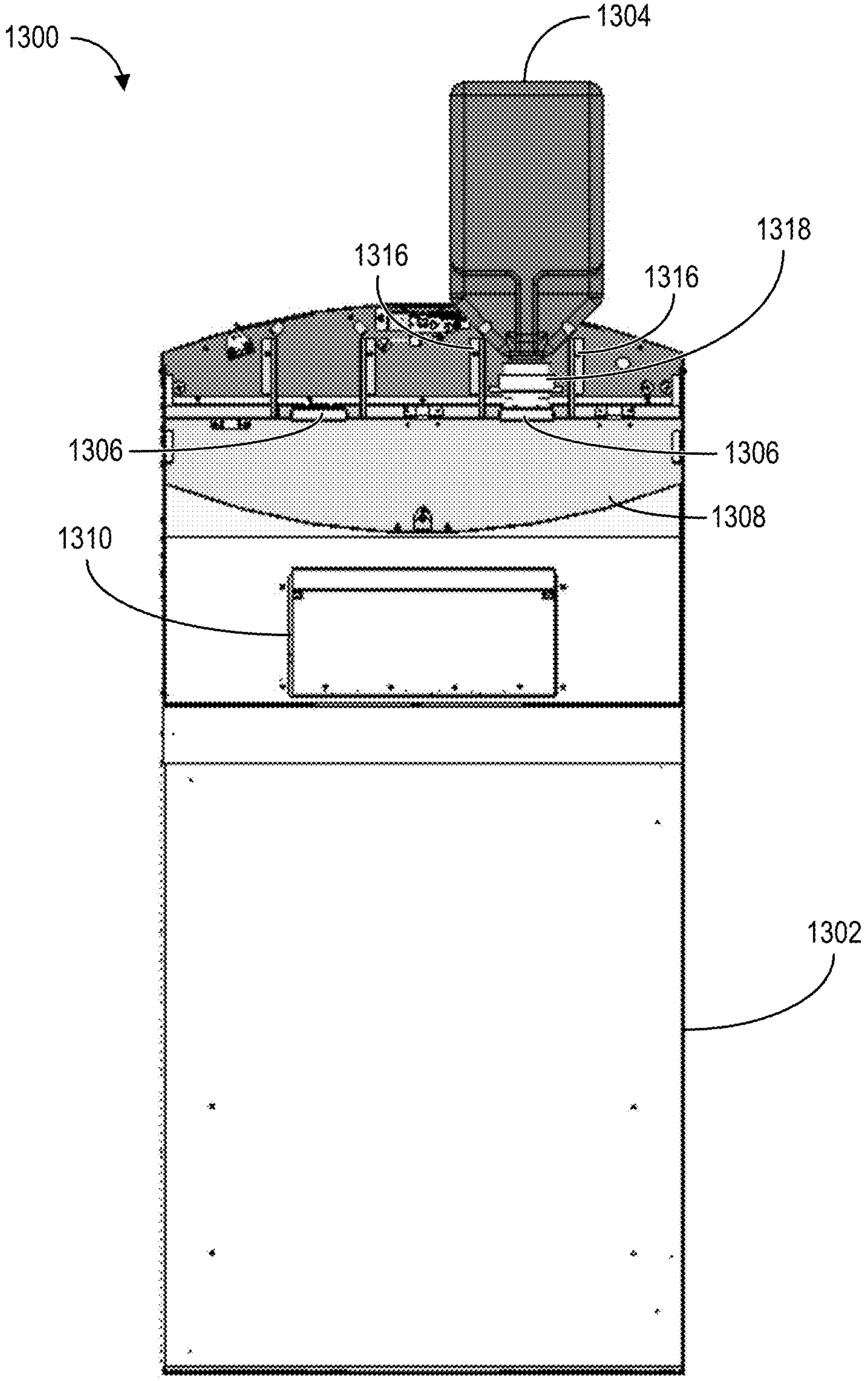
FIG. 13A illustrates a front view of a battery collection system being filled with fire suppressant from a fire suppressant container in accordance with one or more embodiments.
Figure 13B:
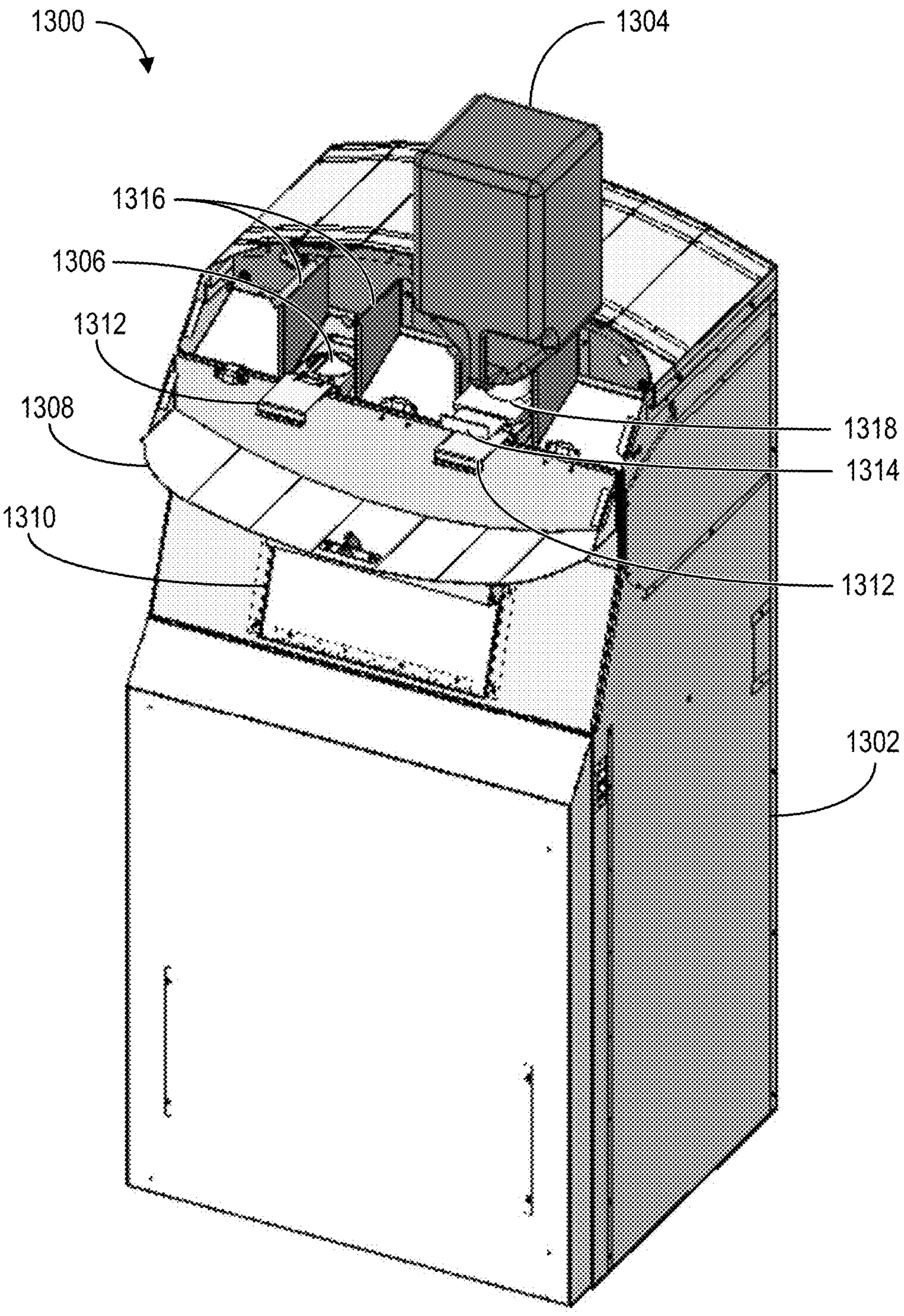
FIG. 13B illustrates a perspective view of the battery collection system of FIG. 13A being filled with fire suppressant from the fire suppressant container in accordance with one or more embodiments.
Figure 13C:
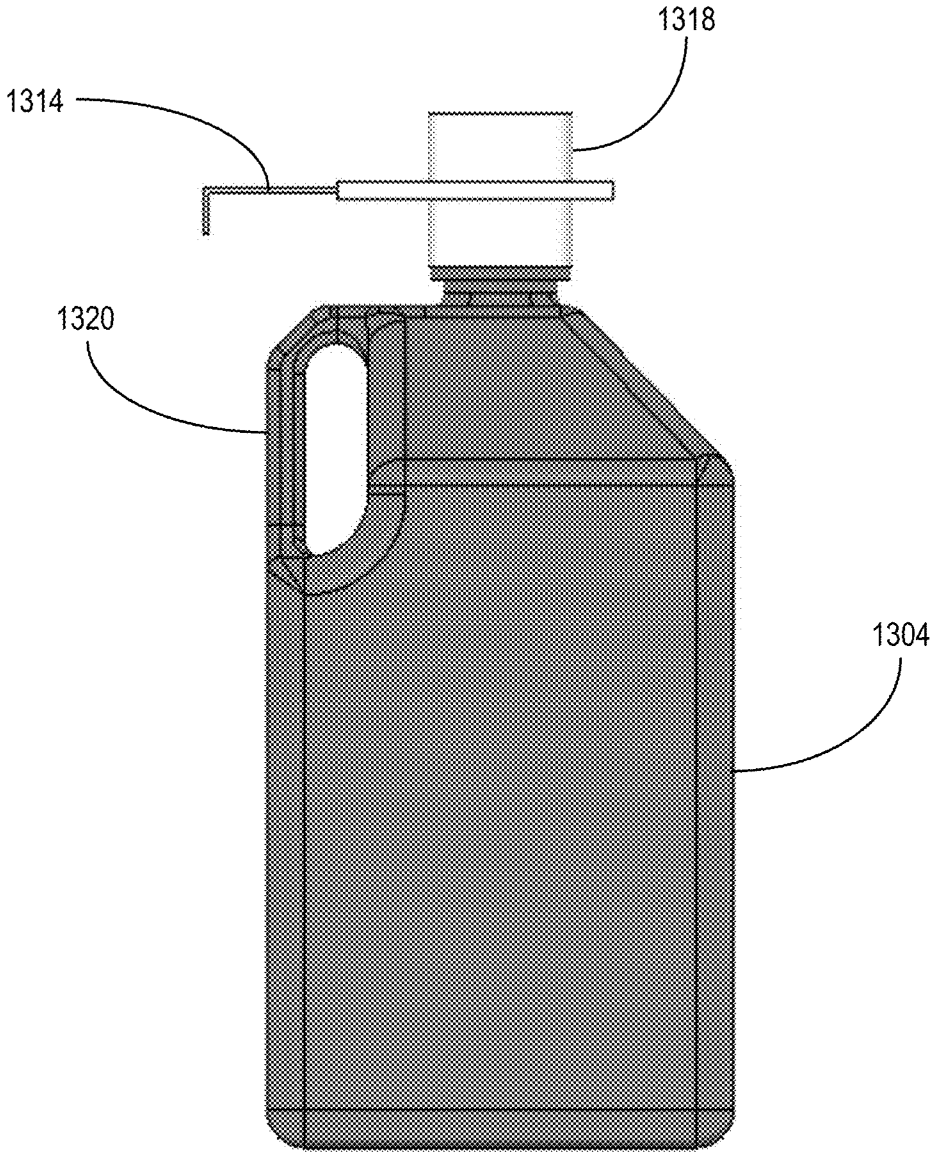
FIG. 13C illustrates a side view of the fire suppressant container of FIGS. 13A-13B.

As mentioned previously, one or more embodiments of the battery collection system include an internal basin and/or hopper for securely storing fire suppressant, fillable via fire suppressant containers. For example, FIGS. 13A-13C illustrate a battery collection system 1300 comprising a battery collection bin 1302 being filled with fire suppressant from a fire suppressant container or jug 1304. In some implementations, for example, fire suppressant is provided via one or more fire suppressant containers (such as the fire suppressant jug 1304) to allow an operator to fill an internal basin of the battery collection bin 1302 with fire suppressant.

As shown in FIGS. 13A and 13B, for instance, the battery collection bin 1302 comprises multiple inlets 1306 accessible via a hinged access panel 1308 located above a feed chute door 1310, such that the hinged access panel 1308 may be locked to prevent tampering by customers when the battery collection bin 1302 is in operation. Moreover, the hinged access panel 1308 is positioned and configured to open below the inlets 1306 to ensure visibility thereof by an operator while filling the battery collection bin 1302 with fire suppressant. As also shown, each of the inlets 1306 is further covered while not in use by an inlet cover 1312 (e.g., a hinged dust flap) to prevent fire suppressant (or dust particles thereof) from escaping through the inlets 1306 when the battery collection bin 1302 is in operation. In some embodiments, the inlet covers 1312 are positioned such that closing the hinged access panel 1308 also closes the inlets covers 1312, thus preventing operators from inadvertently leaving the inlet covers 1312 in an open position.

In order to load the internal basin of the battery collection bin 1302 with fire suppressant, an operator can associate a cap 1318 of the fire suppressant container 1304 with one of the inlets 1306 and open the fire suppressant container 1304 via a slide gate 1314 integrated with the cap 1318. The battery collection bin 1302 also includes a holding bracket

1316 associated with each inlet 1306 to hold the fire suppressant container 1304 in place while filling the internal basin of the battery collection bin 1302. In some implementations, for example, an operator can secure the fire suppressant container 1304 to the holding bracket 1316, then actuate (open) the slide gate 1314 to dispense fire suppressant into the internal basin of the battery collection bin 1302. Accordingly, an operator can secure the fire suppressant container 1304 to one of the inlets 1306 to prevent spills while filling the battery collection bin 1302 with fire suppressant, without additional tools or components. In the implementation shown, the battery collection bin 1302 includes two inlets 1306 and associated holding brackets 1316 to allow for two fire suppressant cartridges to be dispensed simultaneously. In some embodiments, additional inlets (or a single inlet) can be provided.

As particularly shown in FIG. 13C, the fire suppressant container 1304 may comprise a jug sized and configured to be conveniently and safely handled by an operator to fill the battery collection bin 1302 with fire suppressant as needed. The fire suppressant container 1304, for instance, includes the secured cap 1318 with the slide gate 1314, which can be selectively opened during operation and locked while in storage or transit without the use of tools. Moreover, the fire suppressant container 1304 includes a handle 1320 for ease of transport. In various embodiments, the fire suppressant container 1304 is sized to be easy to carry by an operator. In one or more embodiments, for example, the fire suppressant container 1304 weights approximately 10 pounds or less when fully loaded with fire suppressant.

Furthermore, in one or more embodiments, the battery collection system includes additional safety features, such as components for preventing customer exposure to fire suppressant, increases in temperature due to overheating batteries deposited within the battery collection bin, and/or percussion blasts from explosions occurring within the battery collection bin. For example, FIGS. 14A-14B illustrate various anti-spill features of the battery collection bin 1302 configured to prevent fire suppressant from spilling during filling of the battery collection bin 1302 (e.g., as described above in relation to FIGS. 13A-13C).

Figure 14A:
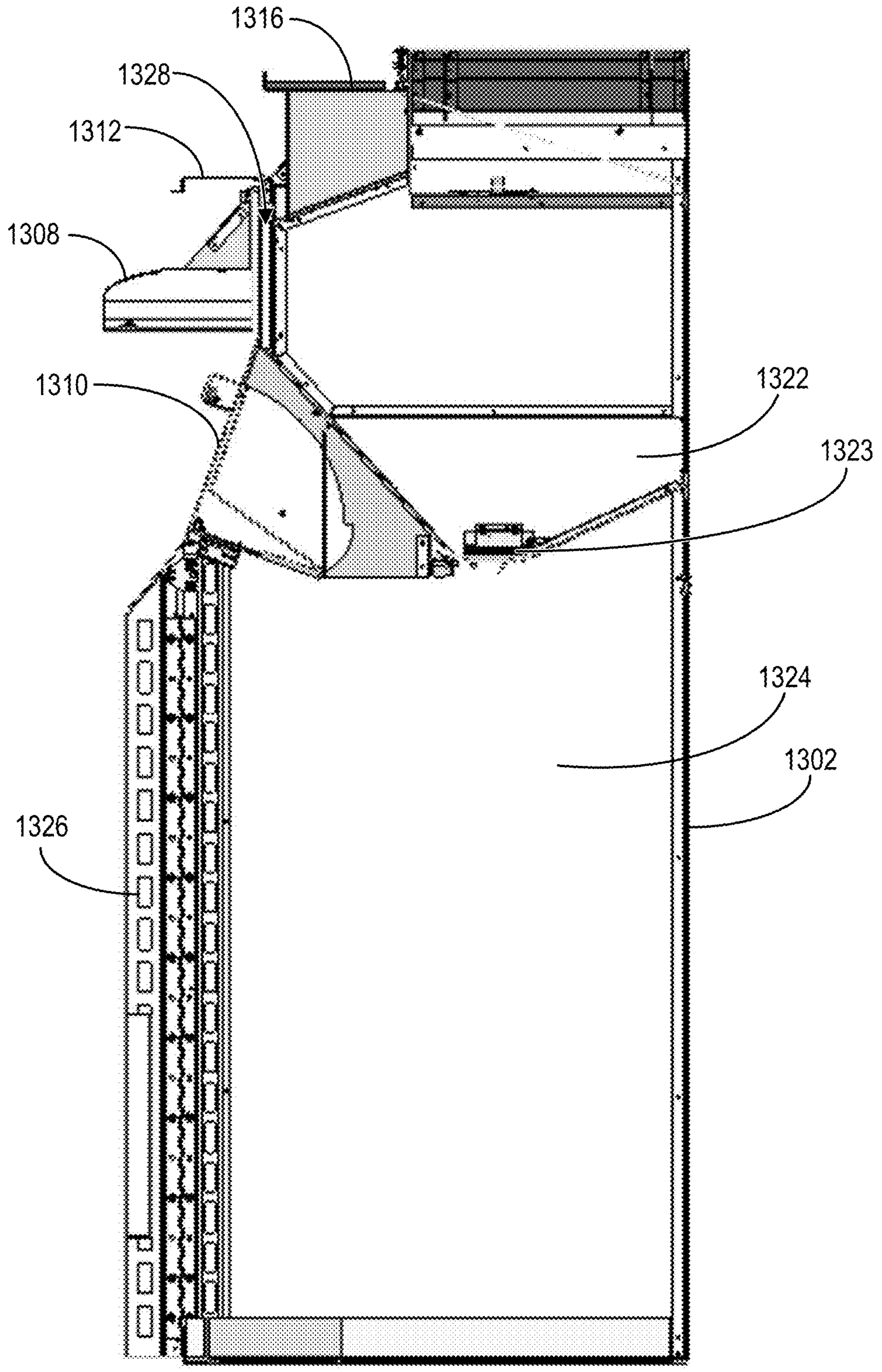
FIG. 14A illustrates a cross-sectional side view of a battery collection system in accordance with one or more embodiments.
Figure 14B:
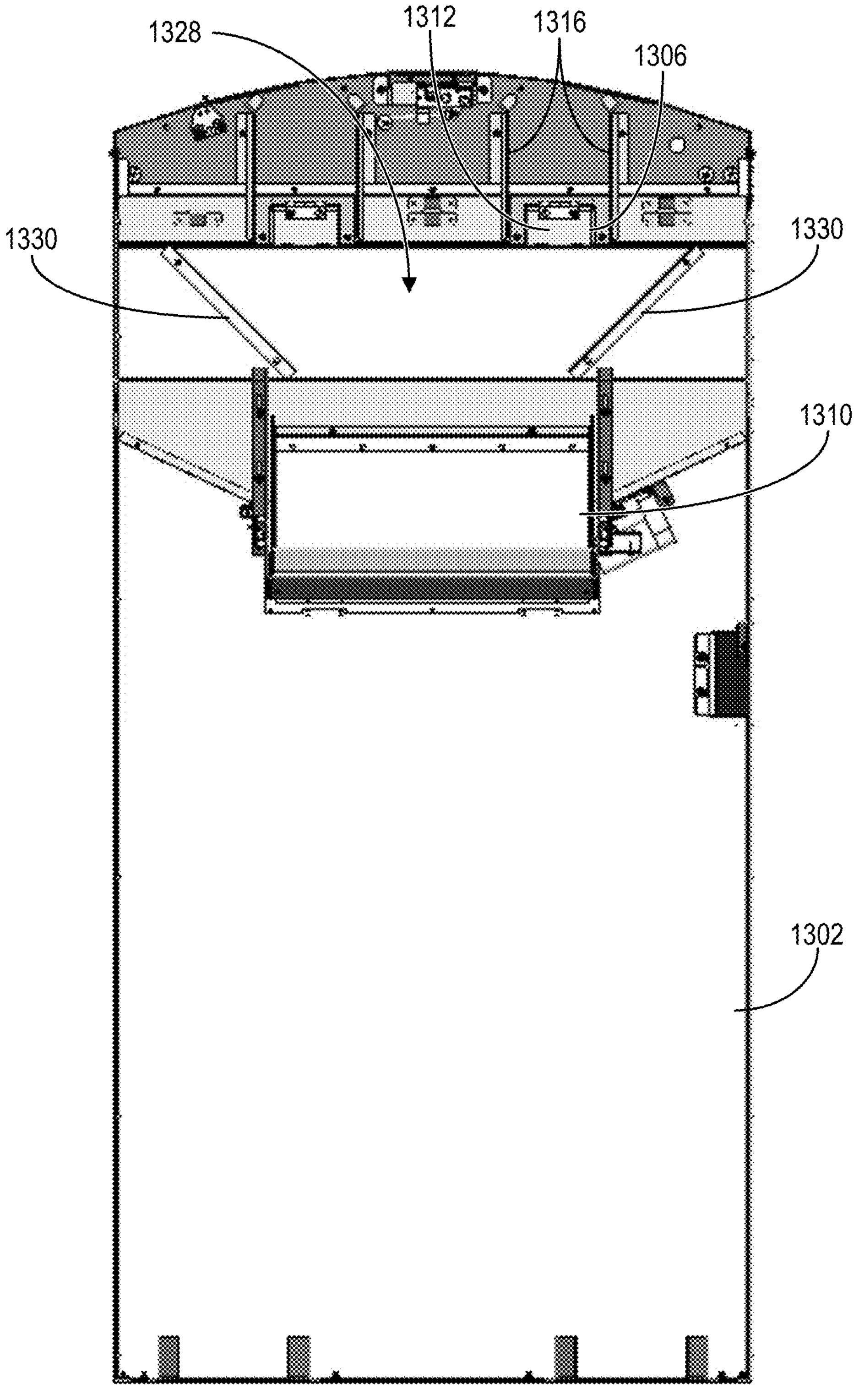
FIG. 14B illustrates a cross-sectional front view of the battery collection system of FIG. 14A.

As shown in FIGS. 14A-14B, for instance, the battery collection bin 1302 includes an internal spill channel 1328 positioned between the holding brackets 1316 and an interior of the feed chute door 1310. In addition, the battery collection bin 1302 includes a spill ramp configured to direct any fire suppressant spilled during filling towards the internal spill channel 1328. As shown, the spill ramp is positioned at a downward angle from the holding brackets 1316 and comprises a pair of angled rails 1330 positioned to further direct fire suppressant towards the internal spill channel 1328. Thus, when fire suppressant is inadvertently spilled during filling (e.g., in proximity to the holding brackets 1316), the spilled fire suppressant is directed by the spill ramp and angled rails 1330 into the internal spill channel 1328 and towards the interior of the feed chute door 1310 (shown as transparent in FIGS. 14A-14B), thereby passing into an enclosure 1324 of the battery collection bin 1302. Alternatively, in some embodiments, spilled fire suppressant can be directed into an interior basin 1322 of the battery collection bin 1302 for later dispersal via a fire suppressant dispenser 1323 (e.g., when an object is deposited). Accordingly, when the access panel 1308, the feed chute door 1310, and an enclosure access door 1326 of the battery collection bin 1302 are secured, consumers and operators of the battery collection bin 1302 are not exposed to fire suppressant that may be inadvertently spilled proximate the inlets 1306 during filling of the internal basin 1322.

Figure 15A:
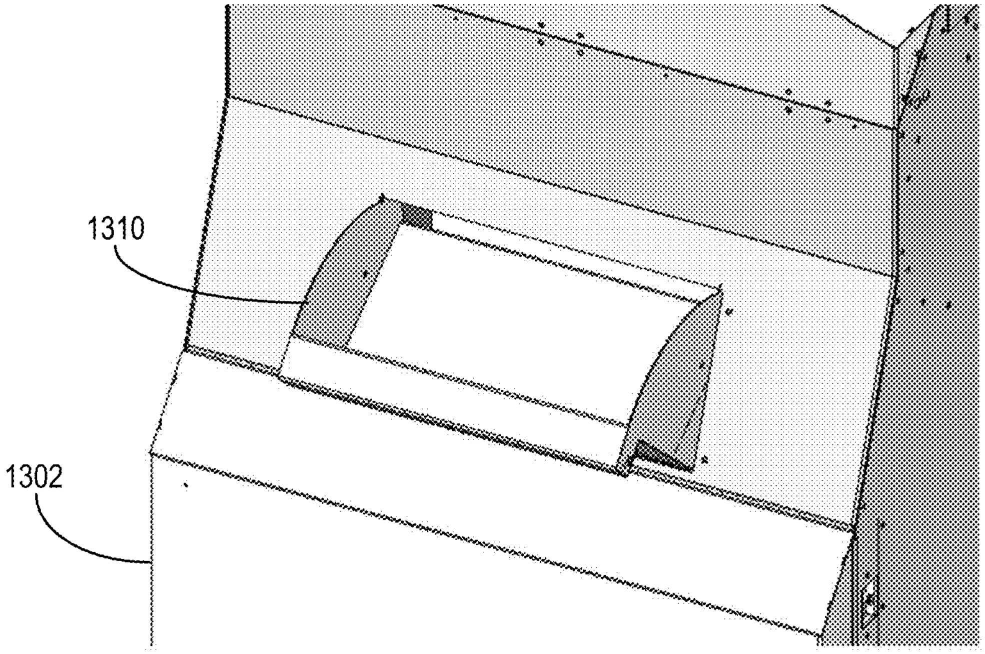
FIG. 15A illustrates a partial perspective view of a battery collection system with a feed chute door opened to receive batteries or devices in accordance with one or more embodiments.
Figure 15B:
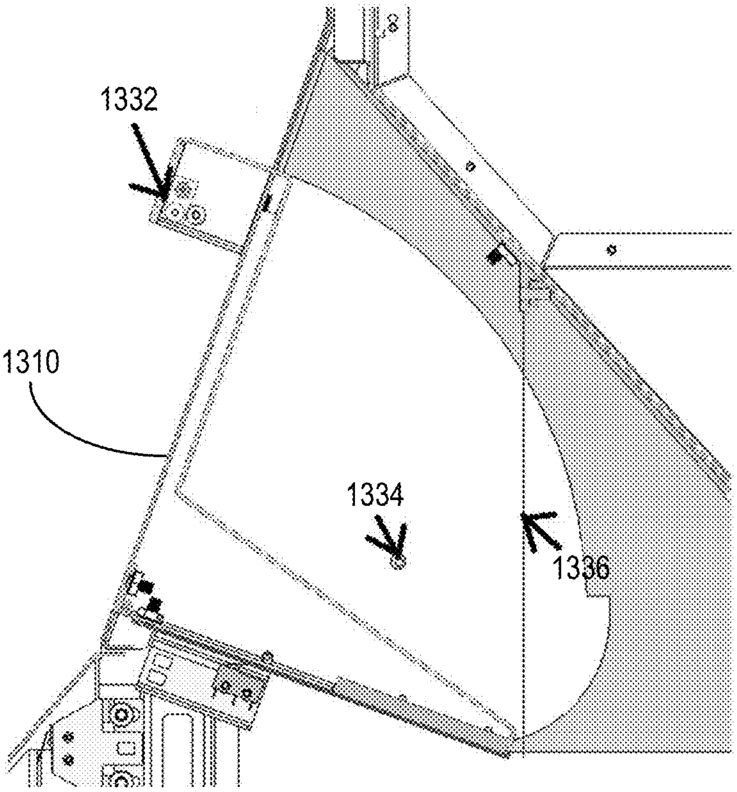
FIG. 15B illustrates a partial cross-sectional side view of the battery collection system of FIG. 15A.

Moreover, in some embodiments, the battery collection system includes additional features for ensuring effective and safe deposit of batteries and other objects within the battery collection bin. For example, FIG. 15A illustrates the feed chute door 1310 of the battery collection bin 1302 in an open position and FIG. 15B illustrates various features associated with the feed chute door 1310. For instance, as particularly shown in FIG. 15B, the feed chute door 1310 comprises a relatively steep internal angle (e.g., approximately 35 degrees below horizontal) when in a closed position to ensure that objects freely slide down the feed chute when deposited. Also, in one or more embodiments, the feed chute door 1310 is sized and positioned allow for deposits of common consumer batteries and electronics therein (e.g., laptop computers, power tool batteries, etc.) while preventing insertion of non-desirable batteries and objects (e.g., car batteries and other lead-acid batteries). Further, as shown in FIG. 15B, the battery collection bin 1302 includes a blockage sensor 1334 configured to detect blockage of the passageway between the feed chute door 1310 and the enclosure of the battery collection bin 1302. In some embodiments, for example, the battery collection system 1300 can restrict consumer access to the battery collection bin 1302 until an obstruction detected by the blockage sensor 1334 is removed.

In some embodiments, the feed chute door 1310 is locked or otherwise secured to prevent the feed chute door 1310 from abruptly opening in case of a fire or explosion within the battery collection bin 1302. As shown in FIG. 15B, for example, the feed chute door 1310 includes a finger sensor 1332 (e.g., beneath a handle thereof) configured to detect user interaction therewith in order to unlock or otherwise activate the feed chute door 1310 for deposit of an object therein. In one or more embodiments, the finger sensor 1332 comprises a low-voltage light sensor configured to detect interaction with a finger of a user on or within the handle of the feed chute door 1310. In some implementations, for example, the finger sensor 1332 comprises a light sensor beam crossing between a light emitter and receiver on opposing interior sides of the handle, such that interaction with the handle by a user breaks the light sensor beam to trigger the finger sensor 1332 and unlock the feed chute door 1310. Alternatively, in some embodiments, the battery collection bin 1302 can include an activation switch near the feed chute door 1310 which, when activated by a user, temporarily unlocks or otherwise activates the feed chute door 1310. Also, in one or more embodiments, the feed chute door 1310 is counterweighted, spring-loaded, or otherwise prevented from being left in an open position.

As also shown in FIG. 15B, the battery collection bin 1302 includes a dust curtain 1336 to prevent fire suppressant and other particulates from escaping the interior of the battery collection bin. In some embodiments, for example the dust curtain 1336 comprises a non-combustible silicone of a particular weight that allows lightweight object to fall into the drum while preventing particulates from exiting the enclosure. Further, in some embodiments, the dust curtain 1336 is sized and positioned to restrict a line-of-sight into the enclosure when the feed chute door 1310 is opened. Also, in some embodiments, a portion of the feed chute door 1310 further prevent sight and physical access to the interior of the battery collection bin 1302, as well as protect a user in the event of an explosion or significant heat from within the battery collection bin 1302.

Figure 16B:
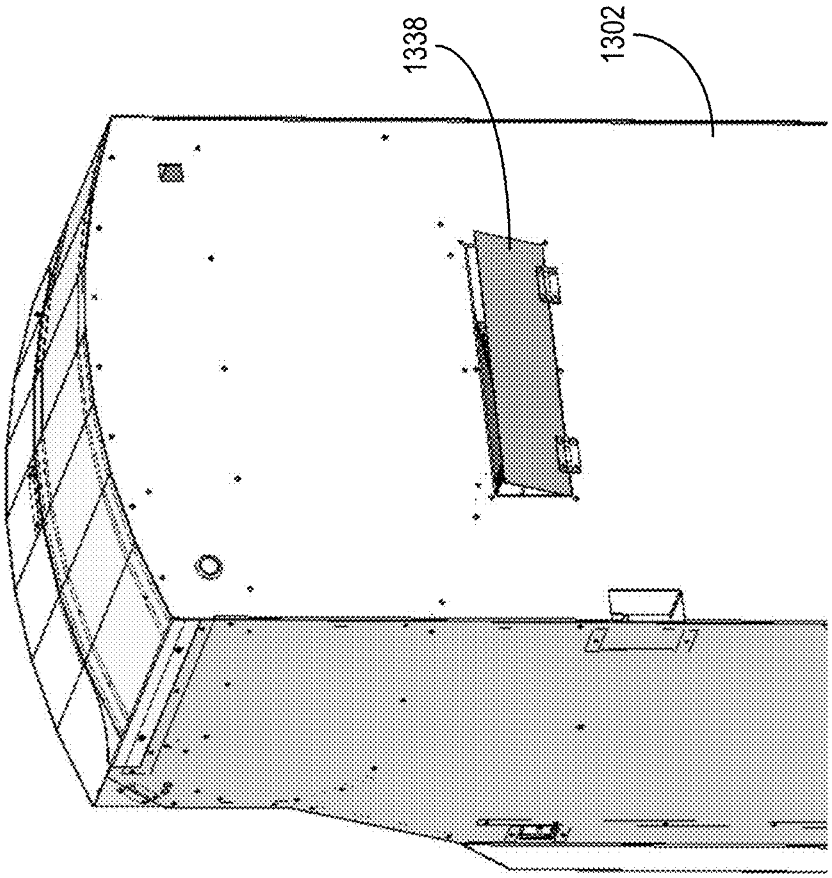
FIGS. 16A-16B illustrate partial perspective views of a percussion blast plate on a battery collection system in accordance with one or more embodiments.
Figure 16A:
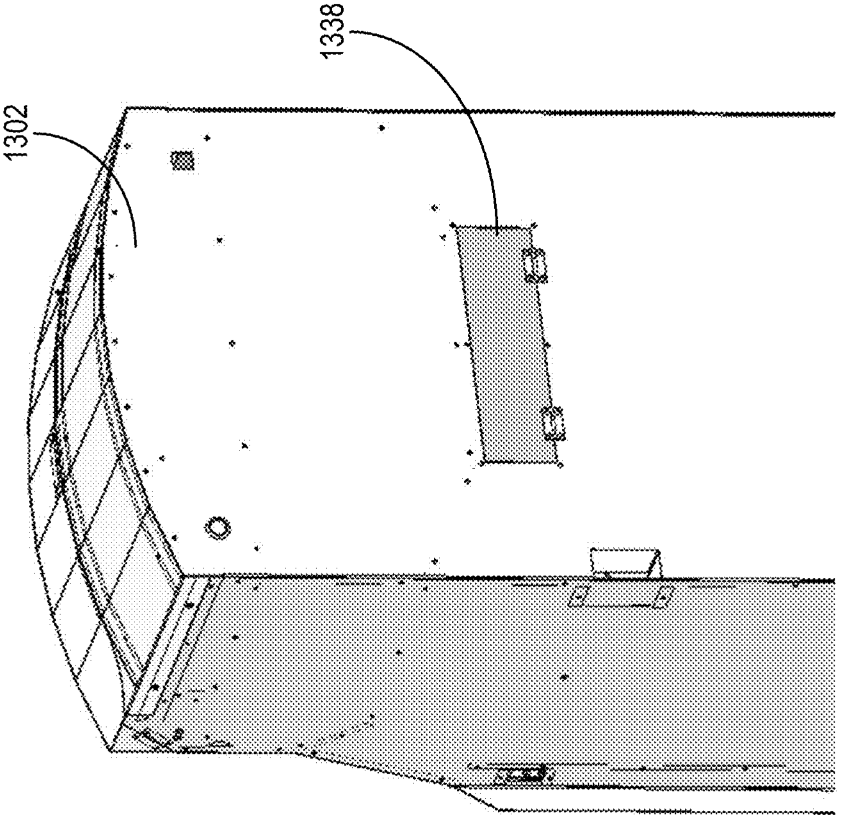

Furthermore, in one or more embodiments, the battery collection bin can include additional safety features configured to redirect explosive or thermal forces occurring within the enclosure thereof in a direction away from consumers. For example, FIGS. 16A-16B illustrate a percussion blast plate 1338 on a back side of the battery collection bin 1302, the percussion blast plate 1338 configured to open in response to percussions within the battery collection bin 1302 (e.g., due to a battery exploding therein). Also, in some embodiments, the percussion blast plate 1338 is sized and configured to remain flush with a rear surface of the battery collection bin 1302 during normal operation to prevent tampering and/or access to the interior of the battery collection bin 1302.

Figure 17:
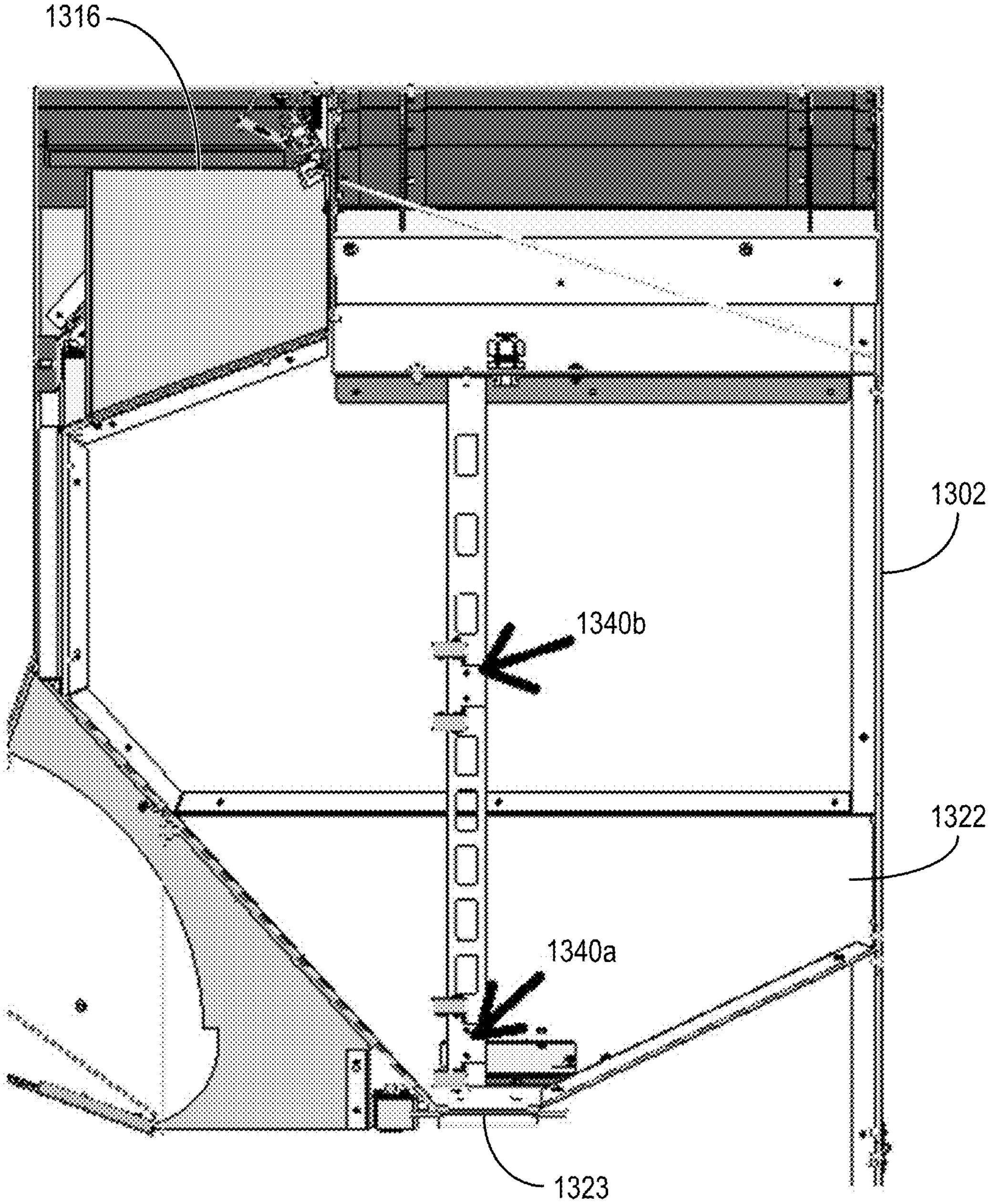
FIG. 17 illustrates a partial cross-sectional side view of an internal fire suppressant basin of a battery collection system in accordance with one or more embodiments.

As mentioned previously, in some embodiments, the battery collection bin includes one or more sensors for detecting a level of fire suppressant available for dispersal over deposited objects. For example, FIG. 17 illustrates the battery collection bin 1302 having a lower fill sensor 1340*a* and an upper fill sensor 1340*b* positioned within the internal basin 1322 thereof. In the illustrated embodiment, for instance, the internal basin 1322 comprises a hopper sized and configured to hold at least an amount of fire suppressant required to fill a transport drum (e.g., a 55 gallon drum). In some embodiments, the internal basin 1322 is sized and configured to hold more fire suppressant than needed to fill the transport drum (e.g., for future use as needed), such as but not limited to an additional 25 percent of the amount required to fill the transport drum.

As shown in FIG. 17, the lower fill sensor 1340*a* is positioned within the internal basin 1322 at a lower level relative to the fire suppressant dispenser 1323 and is configured to detect when the internal basin 1322 is empty or otherwise below a lower threshold amount of fire suppressant. Similarly, the upper fill sensor 1340*b* is positioned within the internal basin 1322 at a higher level relative to the fire suppressant dispenser 1323 and is configured to detect when the internal basin 1322 is filled with an upper threshold amount of fire suppressant. In some embodiments, for example, the lower and upper fill sensors 1340*a-b* comprise light emitters and receivers positioned on opposing interior walls of the internal basin 1322, such that light emitted by each emitter is detected by each respective receiver in the absence of fire suppressant therebetween. Accordingly, the battery collection system 1300 can detect and notify an operator (e.g., via a user interface or other indicators) to fill or stop filling the internal basin 1322 with fire suppressant. Alternatively, in one or more embodiments, different types of sensors are utilized to detect levels of fire suppressant available, such as sensors for detecting a weight of fire suppressant within the internal basin 1322.

Figure 18B:
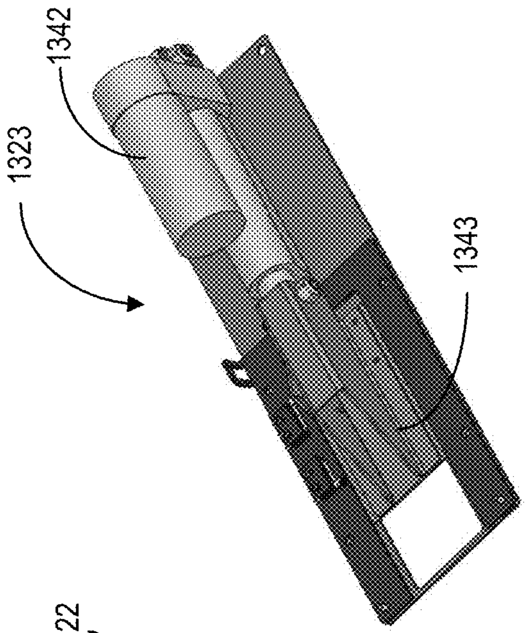
FIG. 18B illustrates a perspective view of a linear motor of the fire suppressant release mechanism of FIG. 18A.
Figure 18A:
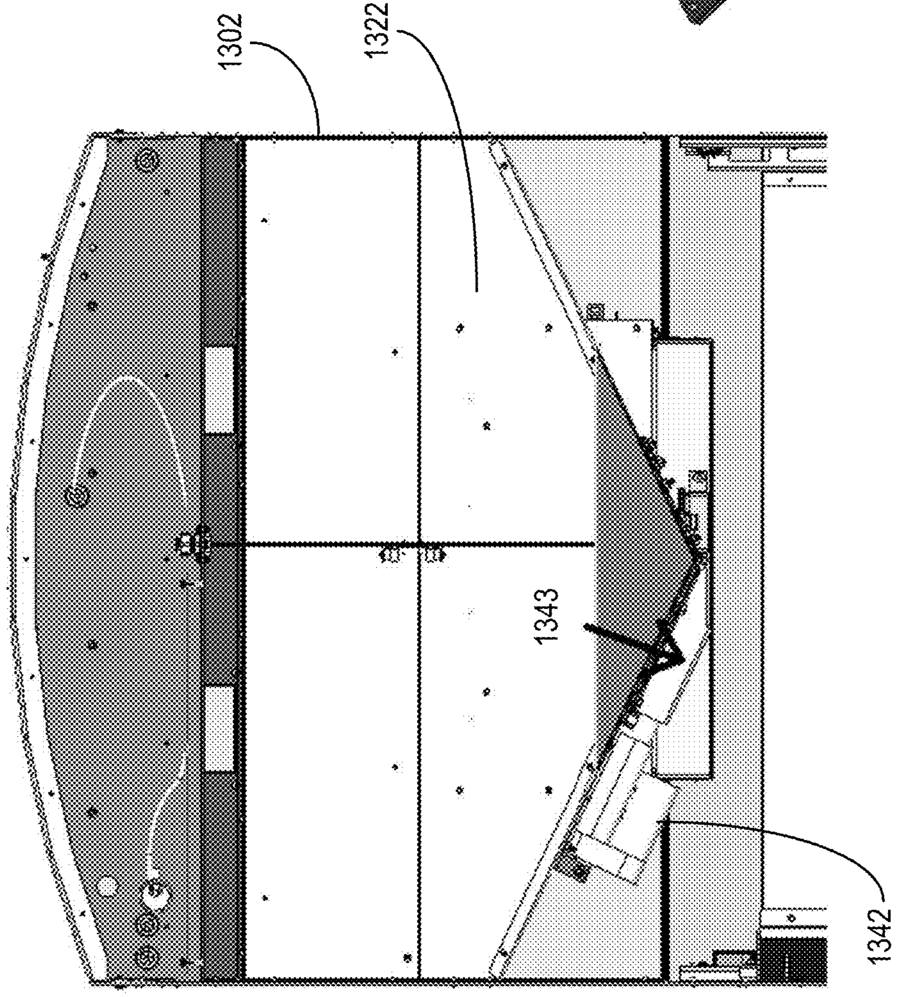
FIG. 18A illustrates a partial cross-sectional front view of a fire suppressant release mechanism of a battery collection system in accordance with one or more embodiments.

As mentioned previously, in one or more embodiments, the battery collection bin dispenses fire suppressant over deposited objects utilizing a fire suppression dispenser mechanism. For example, FIGS. 18A-18B illustrate the fire suppressant dispenser 1323 within the battery collection bin 1302. As shown, the fire suppressant dispenser 1323 is positioned at lower end of the hopper of the internal basin 1322 and comprises a slide gate 1343 linked to a linear motor 1342 configured to open and close the slide gate 1343 to dispense fire suppressant from the internal basin 1322 into the enclosure below. In some embodiments, the linear motor 1342 comprises a gear-reduction, high-torque, slow-speed motor configured to permit and restrict the flow of fire suppressant without stalling. Also, in one or more embodiments, the slide gate 1343 is monitored by a forward limit switch and a backward limit switch to detect jams and, in some cases, restrict user access to the battery collection bin 1302 until the detected jam is fixed. Further, in some embodiments, the battery collection bin 1302 includes a slide cover (e.g., a grate) immediately below and/or above the slide gate 1343 to prevent fingers or other objects from interacting with the slide gate 1343 during operation.

Figure 19B:
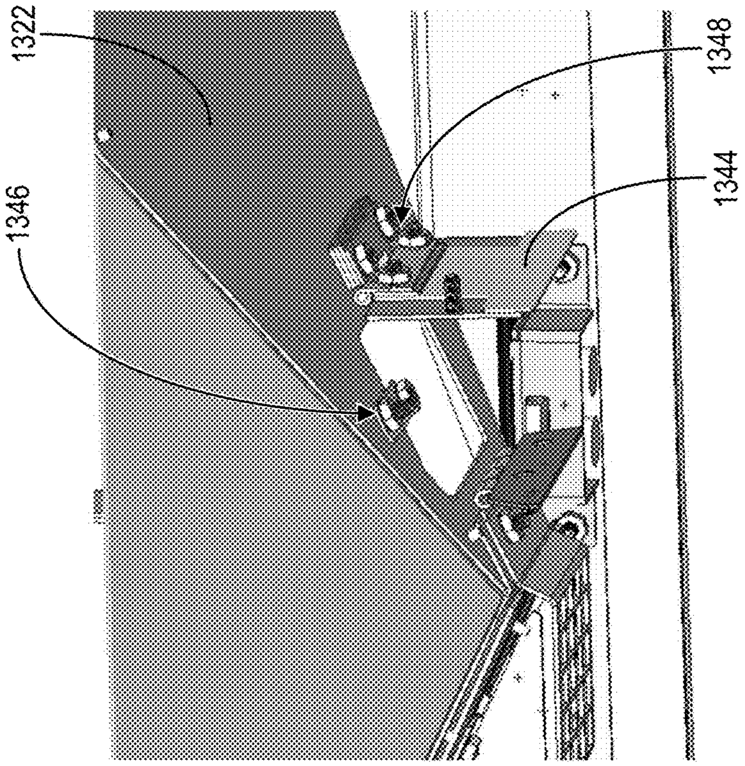
FIGS. 19A-19B illustrate partial perspective views of an emergency release hatch of a battery collection system in accordance with one or more embodiments.
Figure 19A:
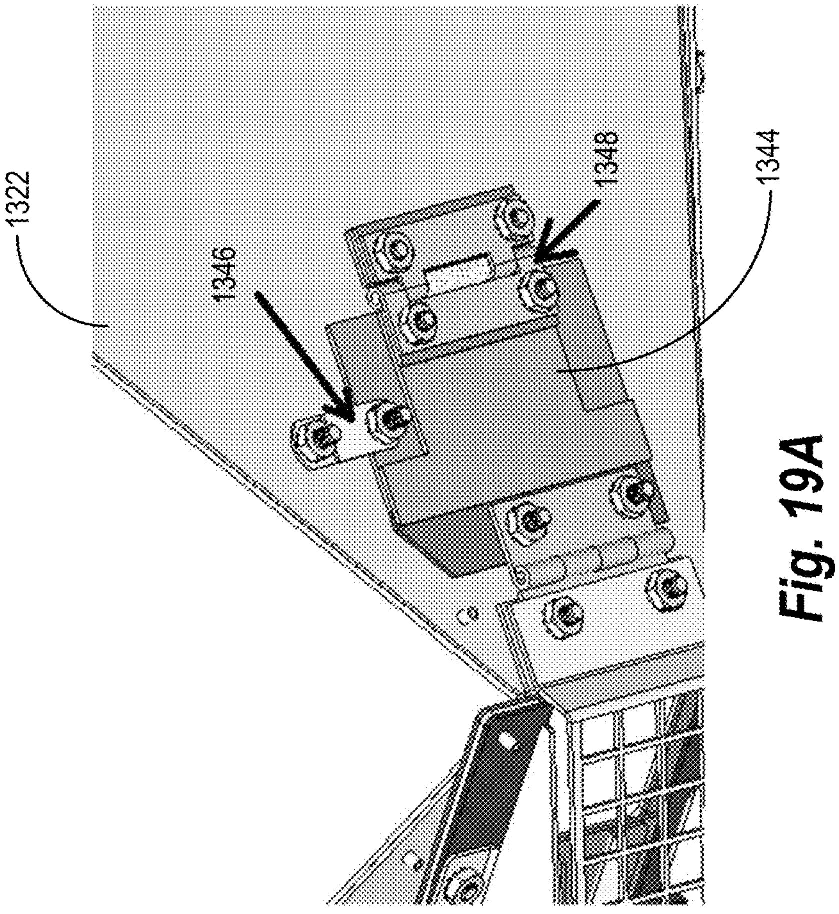
Figure 20A:
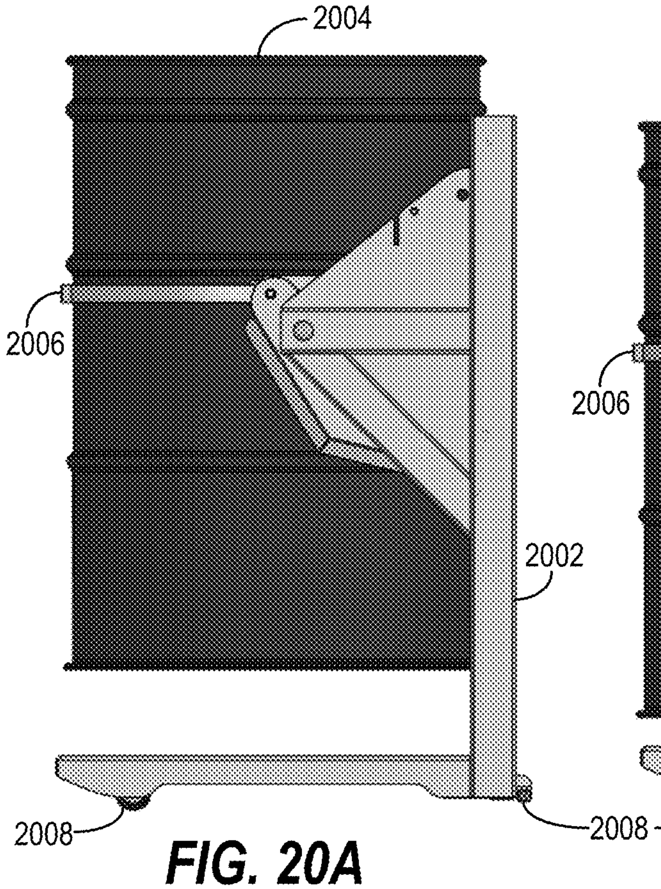
FIGS. 20A-20B illustrate side views of a transport barrel loading mechanism in operation in accordance with one or more embodiments.
Figure 20B:
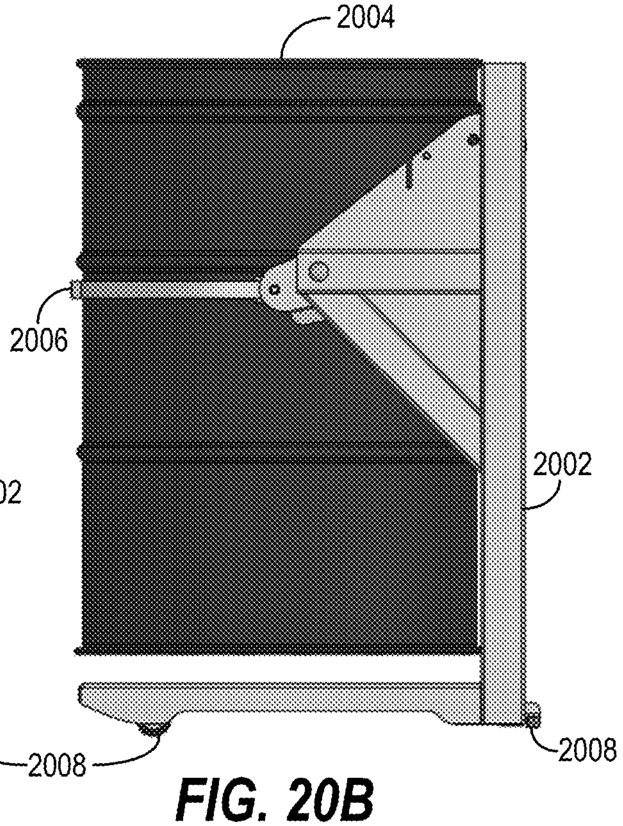
Figure 20C:
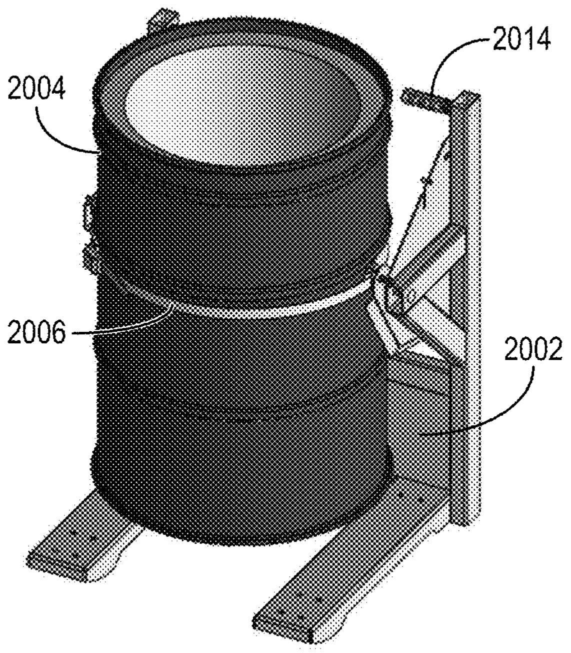
FIGS. 20C-20D illustrate perspective views of the transport barrel loading mechanism of FIGS. 20A-20B.
Figure 20D:
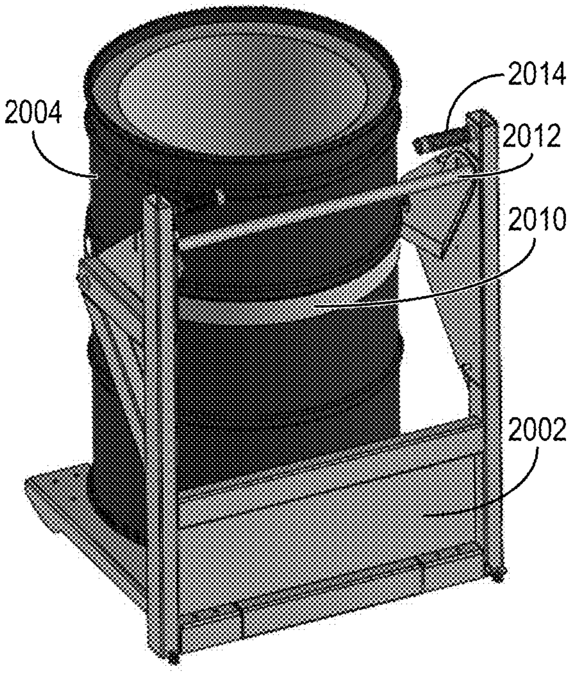

As also mentioned, in some embodiments, the internal basin of the battery collection bin includes an emergency release hatch configured to release fire suppressant into the bin enclosure in the event of an explosion or thermal event. For example, FIGS. 19A-19B illustrate an emergency release hatch 1344 positioned on a lower end of the hopper of the internal basin 1322 and configured to release any remaining fire suppressant into the enclosure below. As shown, the emergency release hatch 1344 comprises a fusible link 1346 configured to break in response to elevated temperatures originating from the enclosure below and a spring hinge 1348 configured to open when the fusible link 1346 is broken due to an elevated temperature. In some embodiments, for example, the fusible link 1346 is configured to melt or otherwise break when reaching a temperature above 135 degrees Fahrenheit. Accordingly, when the fusible link 1346 melts or otherwise fails, the spring hinge 1348 forces at least one flap open, thus exposing a hole within the internal basin 1322 and causing the fire suppressant therein to empty into the enclosure below.

As mentioned previously, some embodiments of the battery collection system include a drum trolley for transporting and positioning a battery collection drum within an enclosure of the battery collection bin. For example, FIGS. 20A-20D illustrate a drum trolley 2002 loaded with a drum 2004 (e.g., a 55 gallon metal drum). In particular, the drum trolley 2002 holds the drum 2004 and provides operators to safely transport full and empty drums between a battery collection bin and a loading dock for transport with assistance in lifting and moving the drum 2004.

As shown in FIGS. 20A-20D, the drum 2004 is secured to the drum trolley 2002 with a strap 2006 (e.g., a quick-release nylon strap) and a metal support band 2010, thus providing horizontal support to prevent the drum 2004 from sliding off of the drum trolley 2002 during lifting and transport. Accordingly, when the drum 2004 is delivered to an operator on a pallet, tines of the drum trolly 2002 can be pushed under the pallet and the drum 2004 secured with the strap 2006. As also shown, the drum trolly 2002 includes a lifting arm 2012 for lifting the secured drum 2004 in order to remove it from the ground or a pallet. In some embodiments, the lifting arm 2012 is spring-assisted and/or includes a locking mechanism for holding the drum 2004 at a raised position (e.g., as particularly shown in FIG. 20A). Further, in some embodiments, the drum trolley 2002 includes one or more overtravel protrusions for preventing the drum 2004 from crashing into the drum trolley 2002 in the event of a sudden release of the lifting arm 2012. With the drum 2004 secured to the drum trolley 2002, an operator can move the drum 2004 with assistance from one or more provided handles 2014 and wheels or casters 2008 disposed underneath the drum trolley 2002.

Figure 21:
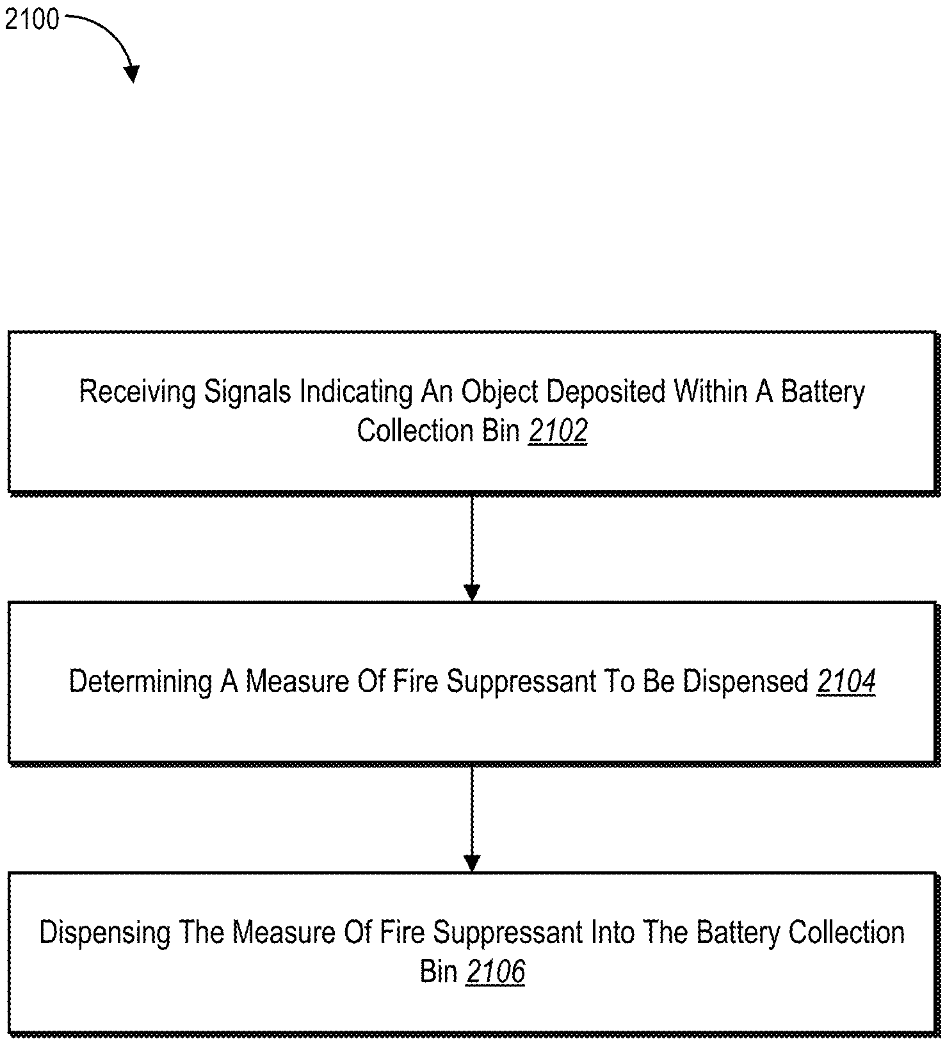
FIG. 21 illustrates a flowchart of a series of acts for automating distribution of fire suppressant over batteries or devices deposited within a battery collection bin in accordance with one or more embodiments.

FIGS. 1-20D, the corresponding text, and the examples provide a number of different methods, systems, devices, and non-transitory computer-readable media of embodiments the battery collection system. In addition to the foregoing, one or more embodiments can also be described in terms of flowcharts comprising acts for accomplishing a particular result, as shown in FIG. 21. FIG. 21 may be performed with more or fewer acts. Further, the acts may be performed in differing orders. Additionally, the acts described herein may be repeated or performed in parallel with one another or parallel with different instances of the same or similar acts.

As mentioned, FIG. 21 illustrates a flowchart of a series of acts 2100 for automating distribution of fire suppressant over batteries or devices deposited within a battery collection bin of a battery collection system according to one or more embodiments. While FIG. 21 illustrates acts according to one embodiment, alternative embodiments may omit, add to, reorder, and/or modify any of the acts shown in FIG. 21. The acts of FIG. 21 can be performed as part of a method. Alternatively, a non-transitory computer-readable medium can comprise instructions that, when executed by one or more processors, cause a computing device to perform the acts of FIG. 21. In some embodiments, a system can perform the acts of FIG. 21.

As shown, FIG. 21 illustrates an example series of acts 2100 for automating distribution of fire suppressant over batteries or devices deposited within a battery collection bin. The series of acts 2100 can include an act 2102 of receiving signals indicating an object deposited within a battery collection bin. In particular embodiments, the act 2102 includes receiving, from one or more sensors, signals indicating an object deposited within a battery collection bin and a fill level of the battery collection bin.

In addition, as shown in FIG. 21, the series of acts 2100 can include an act 2104 of determining a measure of fire suppressant to be dispensed. In particular embodiments, the act 2104 includes determining a measure of fire suppressant based at least on the fill level of the battery collection bin. Also, in some embodiments, the act 2104 includes determining the measure of fire suppressant based on the fill level of the battery collection bin and a detected weight of the deposited object. In some embodiments, the battery collection system utilizes a fire suppressant fill model, such as but not limited to a machine learning model or neural network, to determine the measure of fire suppressant to be dispersed based on a variety of detected attributes (e.g., a quantity, weight, volume, or other categorization of the deposited object(s)).

As also shown in FIG. 21, the series of acts 2100 can include an act 2106 of dispensing the measure of fire suppressant into the battery collection bin. In particular embodiments, the act 2106 includes dispensing, into the battery collection bin, the measure of fire suppressant determined by the act 2104.

Also, in some embodiments, the series of acts 2100 can include acts of determining, in response to receiving signals indicating the fill level of the battery collection bin, that the fill level has reached a threshold fill level, providing, for display on a client device associated with the battery collection bin, an indication that the threshold fill level is reached, and securing one or more access doors to restrict access to the battery collection bin.

Moreover, in some embodiments, the series of acts 2100 can include acts of determining, in response to receiving signals indicating a temperature or thermal rate within the battery collection bin, that a thermal event has occurred, dispensing, into the battery collection bin, additional fire suppressant, and securing one or more access doors to restrict access to the battery collection bin.

Further, in some embodiments, the series of acts 2100 can include acts of receiving one or more signals indicating one or more of an obstruction within a passageway of the battery collection bin or a binding of a fire suppressant dispensing mechanism configured to dispense fire suppressant into the battery collection bin, providing, for display on a client device associated with the battery collection bin, an error message or indication, and securing one or more access doors to restrict access to the battery collection bin.

Additionally, in some embodiments, the series of acts 2100 can include acts of determining, based on one or more signals from sensors positioned within an internal basin of the battery collection bin, that an amount of available fire suppressant has decreased to a threshold amount, providing, for display on a client device associated with the battery collection bin, an indication that the battery collection bin has insufficient fire suppressant available, and securing one or more access doors to restrict access to the battery collection bin.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 22:
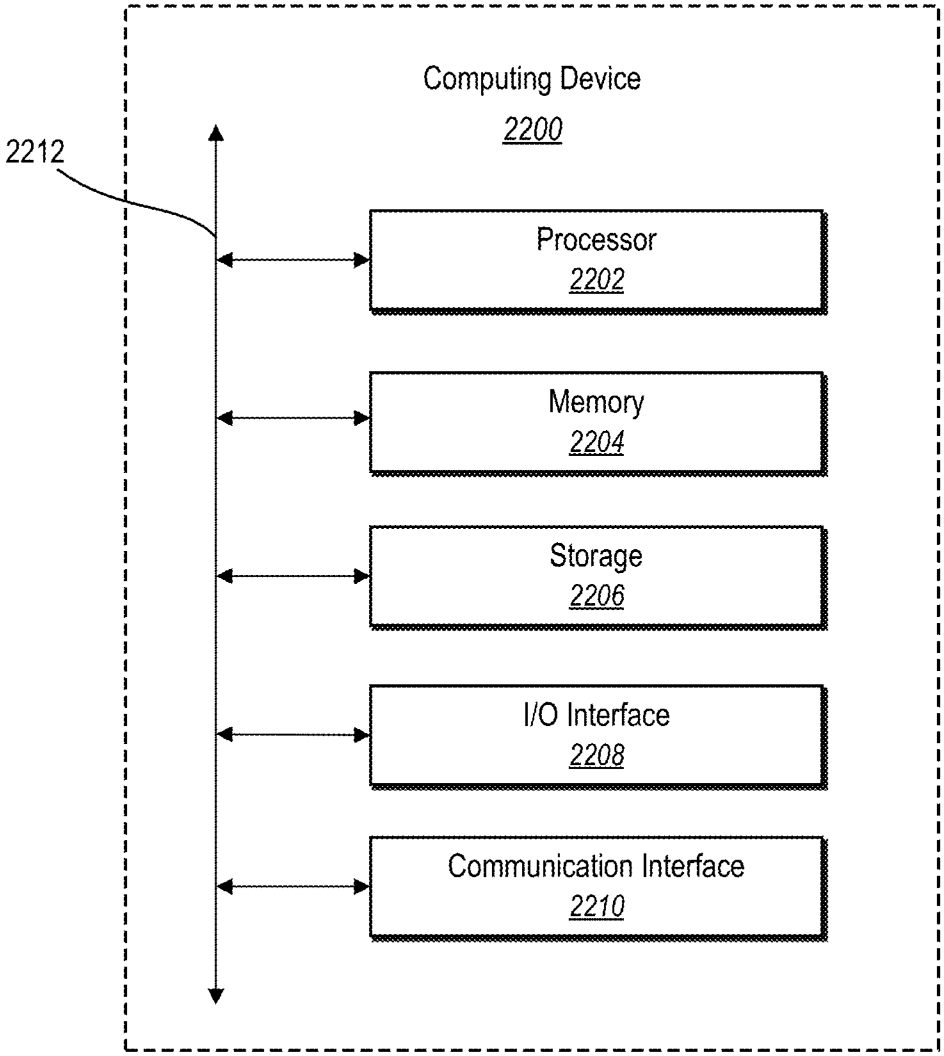
FIG. 22 illustrates a block diagram of an example computing device for implementing one or more embodiments of the present disclosure.

FIG. 22 illustrates a block diagram of an example computing device 2200 that may be configured to perform one or more of the processes described above. One will appreciate that one or more computing devices, such as the computing device 2200 may represent the computing devices described above. In one or more embodiments, the computing device 2200 may be a mobile device (e.g., a mobile telephone, a smartphone, a PDA, a tablet, a laptop, a camera, a tracker, a watch, a wearable device, etc.). In some embodiments, the computing device 2200 may be a non-mobile device (e.g., a desktop computer or another type of client device). Further, the computing device 2200 may be a server device that includes cloud-based processing and storage capabilities.

As shown in FIG. 22, the computing device 2200 can include one or more processor(s) 2202, memory 2204, a storage device 2206, input/output interfaces 2208 (or "I/O interfaces 2208"), and a communication interface 2210, which may be communicatively coupled by way of a communication infrastructure (e.g., bus 2212). While the computing device 2200 is shown in FIG. 22, the components illustrated in FIG. 22 are not intended to be limiting. Additional or alternative components may be used in other embodiments. Furthermore, in certain embodiments, the computing device 2200 includes fewer components than those shown in FIG. 22. Components of the computing device 2200 shown in FIG. 22 will now be described in additional detail.

In particular embodiments, the processor(s) 2202 includes hardware for executing instructions, such as those making up a computer program. As an example, and not by way of limitation, to execute instructions, the processor(s) 2202 may retrieve (or fetch) the instructions from an internal register, an internal cache, memory 2204, or a storage device 2206 and decode and execute them.

The computing device 2200 includes memory 2204, which is coupled to the processor(s) 2202. The memory 2204 may be used for storing data, metadata, and programs for execution by the processor(s). The memory 2204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 2204 may be internal or distributed memory.

The computing device 2200 includes a storage device 2206 includes storage for storing data or instructions. As an example, and not by way of limitation, the storage device 2206 can include a non-transitory storage medium described above. The storage device 2206 may include a hard disk drive (HDD), flash memory, a Universal Serial Bus (USB) drive or a combination these or other storage devices.

As shown, the computing device 2200 includes one or more I/O interfaces 2208, which are provided to allow a user to provide input to (such as user strokes), receive output from, and otherwise transfer data to and from the computing device 2200. These I/O interfaces 2208 may include a mouse, keypad or a keyboard, a touch screen, camera, optical scanner, network interface, modem, other known I/O devices or a combination of such I/O interfaces 2208. The touch screen may be activated with a stylus or a finger.

The I/O interfaces 2208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 2208 are configured to provide graphical data to a display for presentation to a user. The graphical data may be representative of one or more graphical user interfaces and/or any other graphical content as may serve a particular implementation.

The computing device 2200 can further include a communication interface 2210. The communication interface 2210 can include hardware, software, or both. The communication interface 2210 provides one or more interfaces for communication (such as, for example, packet-based communication) between the computing device and one or more other computing devices or one or more networks. As an example, and not by way of limitation, communication interface 2210 may include a network interface controller (NIC) or network adapter for communicating with an Ethernet or other wire-based network or a wireless NIC (WNIC) or wireless adapter for communicating with a wireless network, such as a WI-FI. The computing device 2200 can further include a bus 2212. The bus 2212 can include hardware, software, or both that connects components of computing device 2200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A battery collection bin comprising:
- a transport drum for storing and transporting deposited batteries and devices;
- an enclosure configured to receive and secure the transport drum for storing and transporting deposited batteries and devices;
- a chute operable to direct deposited batteries into the transport drum within the enclosure; and
- a fire suppressant dispensing mechanism configured to selectively dispense fire suppressant into the transport drum within the enclosure when a battery is deposited therein based on one or more of: an indication that a deposit occurred, a resultant fill level of the transport drum, or a detected weight of a deposited object.

2. The battery collection bin of claim 1, further comprising an internal basin disposed above the enclosure and configured to receive and hold fire suppressant, the internal basin associated with the fire suppressant dispensing mechanism for dispersal of the fire suppressant from the internal basin into the transport drum within the enclosure below.

3. The battery collection bin of claim 2, further comprising at least one inlet disposed above the internal basin and configured to direct fire suppressant from a fire suppressant container into the internal basin, the at least one inlet comprising a mounting bracket configured to secure the fire suppressant container in place above the internal basin.

4. The battery collection bin of claim 3, further comprising one or more passageways configured to direct fire suppressant spilled near the at least one inlet into the enclosure.

5. The battery collection bin of claim 1, further comprising one or more sensors configured to determine one or more of a fill level of the transport drum within the enclosure, a number of batteries deposited within the transport drum within the enclosure, or an amount of fire suppressant available for dispersal.

6. The battery collection bin of claim 1, further comprising one or more sensors configured to determine one or more of thermal properties within the enclosure, carbon dioxide levels within the enclosure, or blockage within the chute.

7. The battery collection bin of claim 1, further comprising a percussion blast plate disposed on an outer surface of the battery collection bin and configured to open in event of an explosion within the enclosure to redirect percussion forces of the explosion away from a front side of the battery collection bin.

8. A battery collection system comprising:
- a battery collection bin comprising:
  - an enclosure configured to receive batteries for repurposing or disposal;
  - a hopper disposed above the enclosure and configured to hold fire suppressant; and
  - a fire suppressant dispensing mechanism configured to selectively dispense fire suppressant from the hopper into the enclosure when a battery is deposited therein based on one or more of: an indication that a deposit occurred, a resultant fill level of the battery collection bin, or a detected weight of a deposited object.

9. The battery collection system of claim 8, further comprising a removable transport drum disposed within the enclosure for storing and transporting deposited batteries.

10. The battery collection system of claim 9, further comprising a drum trolley configured to lift and transport the removable transport drum.

11. The battery collection system of claim 8, further comprising a fire suppressant container securable to the battery collection bin and configured to provide fire suppressant to the hopper.

12. The battery collection system of claim 8, further comprising one or more sensors positioned within the hopper and configured to detect an amount of fire suppressant disposed therein.

13. The battery collection system of claim 8, further comprising:
- a chute positioned above the enclosure and operable to direct deposited batteries into the enclosure; and
- a feed chute door configured to lock when the battery collection bin is not in operation.

14. The battery collection system of claim 8, further comprising an emergency release hatch disposed on an underside of the hopper and configured to release fire suppressant from the hopper into the enclosure in response to an elevated temperature.

15. A battery collection system comprising:

one or more memory devices; and one or more processors configured to cause the battery collection system to perform operations comprising:

receiving, from one or more sensors, signals indicating an object deposited within a battery collection bin and a fill level of the battery collection bin;

determining a measure of fire suppressant based at least on one or more of: an indication that the object was deposited within the battery collection bin, the fill level of the battery collection bin after receiving the deposited object, or a detected weight of the deposited object; and dispensing, into the battery collection bin, the measure of fire suppressant.

16. The battery collection system of claim 15, the operations further comprising:

determining, in response to receiving signals indicating the fill level of the battery collection bin, that the fill level has reached a threshold fill level;

providing, for display on a client device associated with the battery collection bin, an indication that the threshold fill level is reached; and securing one or more access doors to restrict access to the battery collection bin.

17. The battery collection system of claim 15, the operations further comprising:

determining, in response to receiving signals indicating a temperature or thermal rate within the battery collection bin, that a thermal event has occurred;

dispensing, into the battery collection bin, additional fire suppressant; and securing one or more access doors to restrict access to the battery collection bin.

18. The battery collection system of claim 15, the operations further comprising:

receiving one or more signals indicating one or more of an obstruction within a passageway of the battery collection bin or a binding of a fire suppressant dispensing mechanism configured to dispense fire suppressant into the battery collection bin;

providing, for display on a client device associated with the battery collection bin, an error message or indication; and securing one or more access doors to restrict access to the battery collection bin.

19. The battery collection system of claim 15, the operations further comprising:

determining, based on one or more signals from sensors positioned within an internal basin of the battery collection bin, that an amount of available fire suppressant has decreased to a threshold amount;

providing, for display on a client device associated with the battery collection bin, an indication that the battery collection bin has insufficient fire suppressant available; and securing one or more access doors to restrict access to the battery collection bin.

20. The battery collection system of claim 15, the operations further comprising determining the measure of fire suppressant based on the fill level of the battery collection bin and a detected weight of the deposited object.

* * * * *